(12) United States Patent
Oshima et al.

(10) Patent No.: US 11,260,630 B2
(45) Date of Patent: Mar. 1, 2022

(54) WOOD LAMINATE MATERIAL AND METHOD FOR MANUFACTURING SAME

(71) Applicant: DAIKEN CORPORATION, Toyama (JP)

(72) Inventors: Katsuhito Oshima, Toyama (JP); Kazuki Sakamoto, Toyama (JP); Kazuhiro Hirata, Toyama (JP); Koji Nagaoka, Toyama (JP); Yasushi Sugio, Toyama (JP)

(73) Assignee: DAIKEN CORPORATION, Toyama (JP)

( * ) Notice: Subject to any disclaimer, the term of this patent is extended or adjusted under 35 U.S.C. 154(b) by 0 days.

(21) Appl. No.: 16/088,904

(22) PCT Filed: Sep. 20, 2017

(86) PCT No.: PCT/JP2017/033872
§ 371 (c)(1),
(2) Date: Sep. 27, 2018

(87) PCT Pub. No.: WO2018/061923
PCT Pub. Date: Apr. 5, 2018

(65) Prior Publication Data
US 2019/0099987 A1   Apr. 4, 2019

(30) Foreign Application Priority Data

Sep. 30, 2016   (JP) .............................. JP2016-194762
Mar. 28, 2017   (JP) ................................. 2017-063447

(51) Int. Cl.
*B32B 21/02*   (2006.01)
*B32B 7/03*    (2019.01)
(Continued)

(52) U.S. Cl.
CPC ................ *B32B 21/02* (2013.01); *B27N 3/00* (2013.01); *B27N 3/143* (2013.01); *B32B 5/16* (2013.01);
(Continued)

(58) Field of Classification Search
CPC ....... B32B 21/02; B32B 21/042; B32B 21/13; B32B 21/14; B32B 2317/16;
(Continued)

(56) References Cited

U.S. PATENT DOCUMENTS 5,234,747 A * 8/1993  Walser ..................... B27D 1/00
                                                          428/215
6,602,451 B1    8/2003  Korai
(Continued)

FOREIGN PATENT DOCUMENTS

CA         2987801 A      12/2016
CN       102198684 A      9/2011
(Continued)

OTHER PUBLICATIONS

Engineering ToolBox, (2004). Density of Various Wood Species, [online] Available at: https://www.engineeringtoolbox.com/wood-density-d_40.html Accessed: 2020.*
(Continued)

*Primary Examiner* — Alicia J Sawdon
(74) *Attorney, Agent, or Firm* — Renner, Otto, Boisselle & Sklar, LLP

(57) ABSTRACT

Provided is a strand board with improved strength and water resistance. Reduction in productivity is prevented and characteristics of the strand board can be varied as desired while achieving certain strength and water resistance of the strand board. A strand board B is formed by stacking and laminating five strand layers 1 each formed by a large number of strands 5. The strand board B has substantially constant
(Continued)

density distribution in the lamination direction of the strand layers 1. Three of the five strand layers 1 of the strand board B are high-density strand layers 1*a* having a higher density than the other strand layers 1, and the other strand layers 1 are low-density strand layers 1*b*.

12 Claims, 16 Drawing Sheets

(51) Int. Cl.
    *B32B 21/14*     (2006.01)
    *B32B 5/16*     (2006.01)
    *B32B 37/18*     (2006.01)
    *B32B 21/04*     (2006.01)
    *B27N 3/14*     (2006.01)
    *B27N 3/00*     (2006.01)
    *B32B 21/13*     (2006.01)

(52) U.S. Cl.
    CPC ............. *B32B 7/03* (2019.01); *B32B 21/042* (2013.01); *B32B 21/13* (2013.01); *B32B 21/14* (2013.01); *B32B 37/18* (2013.01); *B32B 2317/16* (2013.01); *B32B 2419/00* (2013.01)

(58) Field of Classification Search
    CPC ....... B32B 2419/00; B32B 37/18; B32B 5/16; B32B 7/03; B32B 2307/72; B27D 1/04; B27D 1/06
    See application file for complete search history.

(56) References Cited

U.S. PATENT DOCUMENTS

2004/0241414 A1    12/2004    Egger
2009/0061189 A1*    3/2009    Ou ....................... B32B 21/042
                                                                              428/218
2011/0220271 A1*    9/2011    Fyie ...................... B32B 21/042
                                                                              156/182
2011/0291441 A1*    12/2011    Burton ................ B32B 38/1808
                                                                              296/184.1

FOREIGN PATENT DOCUMENTS

| JP | H06-262601 A | | 9/1994 |
|---|---|---|---|
| JP | H07-195313 A | | 8/1995 |
| JP | H11-240001 A | | 9/1997 |
| JP | 2000-167813 A | | 6/2000 |
| JP | 2005-074694 A | | 3/2005 |
| JP | 4227864 B | | 12/2008 |
| JP | 4307992 B | | 5/2009 |
| JP | 2010-099942 A | | 5/2010 |
| JP | 2014-069368 A | | 4/2014 |
| JP | 2015-061770 A | | 4/2015 |
| JP | 2015061770 A | * | 4/2015 |
| JP | 2015-174280 A | | 10/2015 |

OTHER PUBLICATIONS

International Search Report for corresponding App. No. PCT/JP2017/033872, dated Dec. 26, 2017.
Partial Search Report issued by EUIPO for corresponding European Patent Application No. 17855878.9 dated Apr. 28, 2020.
Wood Review: A Review of Materials Used in Classical Chinese Furniture; Shanxi Ancient Books Publishing House; First Edition in May 2006; with partial translation.
Office Action issued from the Canadian Intellectual Property Office for Canadian Patent Application 3019340 dated Sep. 25, 2020.
Office Action issued from the Canadian Intellectual Property Office for Canadian Patent Application 3082544 dated Jun. 18, 2021.
Office Action issued from the Canadian Intellectual Property Office for Canadian Patent Application 3,082,544 dated Dec. 16, 2021.

* cited by examiner

FIG.9

| | Density of High-Density Strand Layer (kg/m³) | Proportion of High-Density Strand Layer(s) To Strand Board (%) | Product Layer Configuration | Product Thickness (mm) | Product Density (kg/m³) | Position(s) Of High-Density Strand Layer(s) (Layer Number(s)) | Effects |
|---|---|---|---|---|---|---|---|
| First Example | 1000 | 40 | 5 | 28 | 850 | 2, 4 (Entire Layers) | Reduce Press Pressure Improve Nail Pull Resistance |
| Second Example | 1100 | 40 | 5 | 9 | 650 | 1, 5 (Entire Layers) | Improve Flexural Strength Improve Surface Water Resistance |
| Third Example | 1000 | 30 | 7 | 12 | 650 | 1, 7 (Entire Layers) | Improve Flexural Strength Improve Surface Water Resistance |
| Fourth Example | 800 | 60 | 3 | 18 | 700 | 2 (Entire Layer) | Flat Density Reduce or Eliminate Risk of Delamination Improve Productivity |
| Fifth Example | 800 | 80 | 3 | 15 | 700 | 1, 3 (Entire Layers) | Improve Longitudinal Bending Strength and Shear Strength |
| Sixth Example | 1000 | 60 | 5 | 28 | 850 | 2 To 4 (Entire Layers) | Reduce Press Pressure Improve Nail Pull Resistance Improve Productivity |

FIG.11

|  |  | Example 1 | Example 2 | Comparative Example 1 | Comparative Example 2 |
|---|---|---|---|---|---|
| Strands | Density[kg/m³] | 500~600 | 450~550 | 400~500 | 350~450 |
| Multi-Layered Mat | Number of Layers | 5 | 5 | 5 | 5 |
|  | Height[mm] | 37 | 35 | 42 | 36 |
| Hot Pressing Conditions | Pressure[N/mm²] | 4 | 4 | 8 | 8 |
|  | Time[m] | 10 | 10 | 10 | 10 |
|  | Time Required to Obtain Target Thickness[s] | 196 | 38 | 78 | 15 |
| After Pressing | Density | 818 | 832 | 779 | 812 |
|  | Thickness | 12.4 | 12.2 | 12.7 | 12.4 |
| Bending Test | Pmax[N] | 5853 | 4298 | 5608 | 4438 |
|  | MOR[N/mm²] | 111 | 84 | 100 | 83 |
|  | MOE[N/mm2] | 4964 | 5671 | 3408 | 5179 |
| Water Absorption and Dimensional Change Tests | Dimensional Change[%] (1st Boiling) | 28.6 | 18.0 | 27.7 | 20.9 |
|  | Water Absorption[%] (1st Boiling) | 60 | 46 | 61 | 52 |
|  | Dimensional Change[%] (2nd Boiling) | 29.7 | 19.1 | 28.4 | 20.6 |
|  | Water Absorption[%] (2nd Boiling) | 63 | 60 | 65 | 61 |

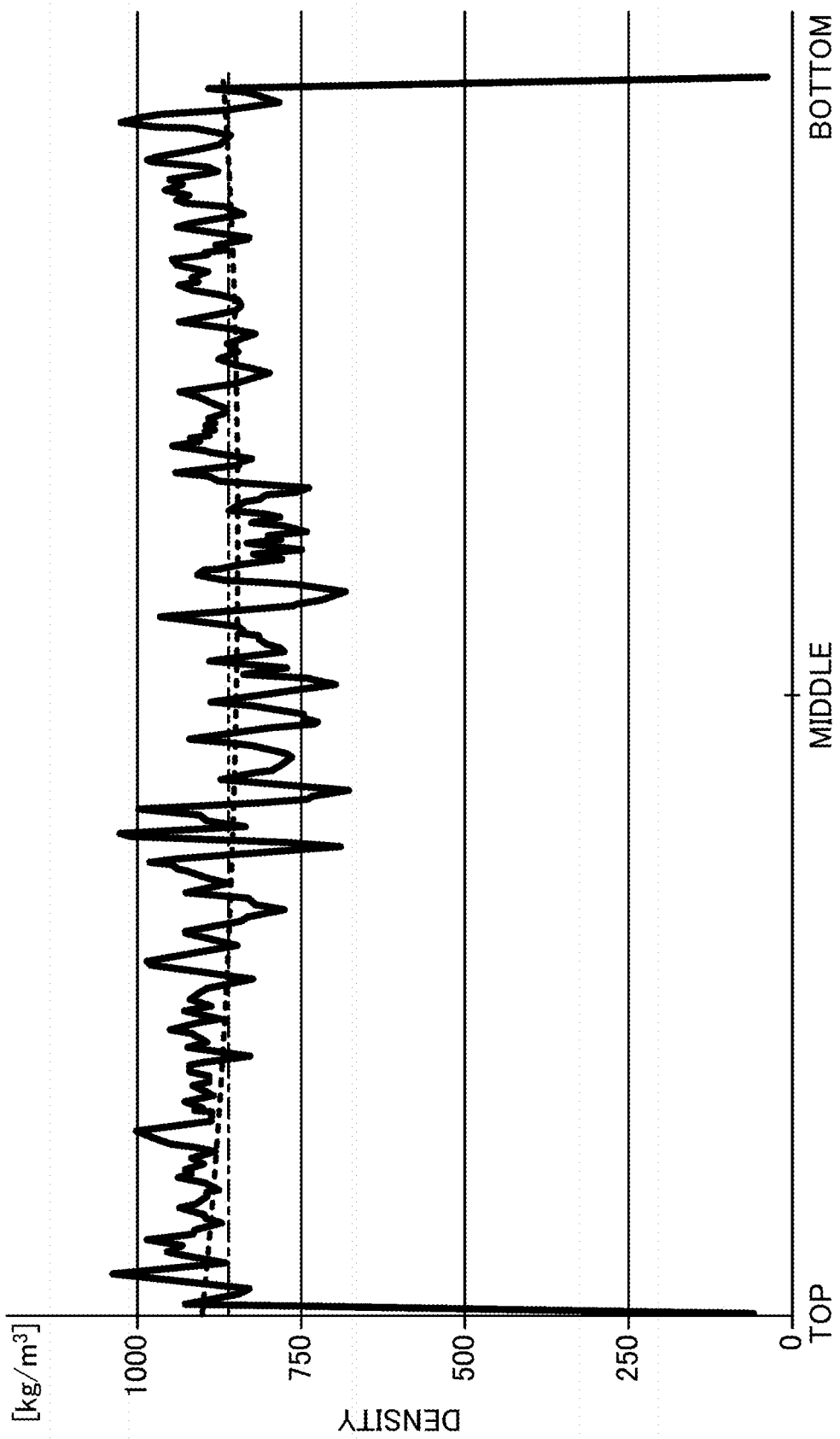

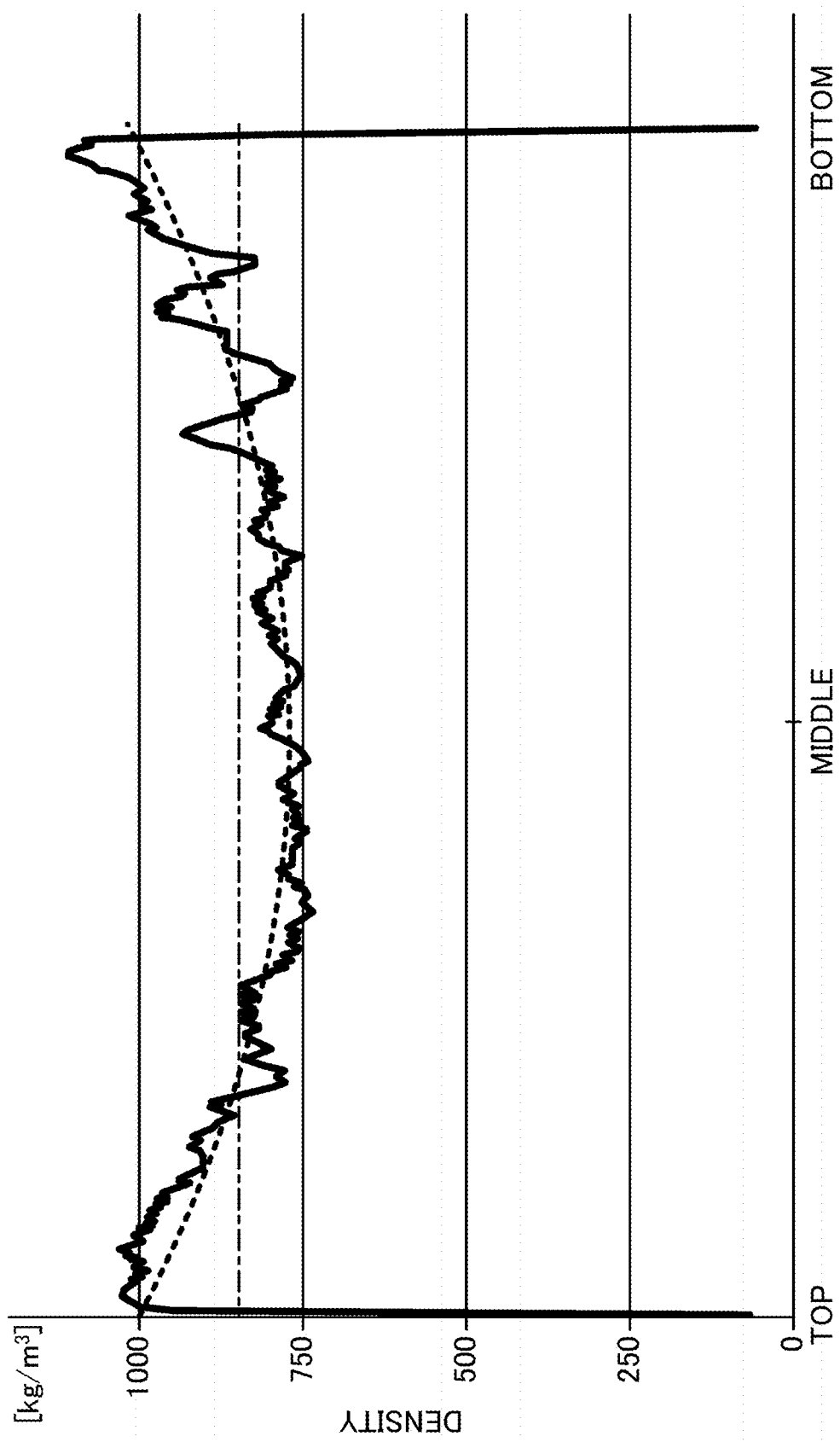

|  | Height of Multi-Layered Mat [mm] | Time Required to Achieve Target Thickness [s] | Normal-State Bending Test | | | |
|---|---|---|---|---|---|---|
|  |  |  | Thickness [mm] | Density [kg/m³] | MOR [N/mm²] | MOE [N/mm²] |
| Example 1 | 53 | 24 | 8.9 | 659 | 105 | 13487 |
| Example 2 | 52 | 12 | 9.0 | 675 | 96 | 13937 |
| Comparative Example 1 | 62 | 33 | 9.2 | 658 | 97 | 12885 |

FIG.16

| | Press Pressure [N/mm²] | Press Temperature [°C] | MDI Content [%] | Thickness [mm] | Density [kg/m³] | Normal-State Bending Test | | | | Boiling Test (×2) | | |
|---|---|---|---|---|---|---|---|---|---|---|---|---|
| | | | | | | Pmax [N] | MOR [N/mm²] | MOE [N/mm²] | | TS [%] | WA [%] | IB [N/mm²] |
| Example 3 | 4 | 140 | 12 | 12.5 | 846 | 5638 | 105 | 5208 | | 32.3 | 78.5 | |
| Comparative Example 2 | 8 | | | 12.6 | 848 | 5576 | 102 | 2821 | | 23.5 | 39.9 | 2.1 |

FIG.18

Design Thickness: 28mm

| | Strand Thickness | Press Temperature [°C] | Press Pressure Prototype Size [N/mm²] | Test State | Thickness [mm] | Bending Direction | Density [kg/m³] | Pmax [N] | MOR [N/mm²] | MOE [N/mm²] | Elastic Limit Pmax [N] | Ratio of ELP [%] | Inside Share Strength [kg/m²] | Density [kg/m³] | TS [%] | WA [%] | IB [N/mm²] |
|---|---|---|---|---|---|---|---|---|---|---|---|---|---|---|---|---|---|
| | | | | | | | | | Short-Span Bending Physical Property Values | | | | | | Boiling Test (TS, WA: After 2nd Boiling) | | |
| Example 4 | Aspen 0.8mm | 160 | 8 | Normal State | 27.3 | Longitudinal N=3 | 882 | 9025 | 92 | 5675 | 5121 | 57 | 28.0 | 857 | 21 | 36 | 1.9 |
| | | | | | | Lateral N=2 | 867 | 1141 | 12 | 1562 | — | — | — | Bond Durability Test (Warm Water and Reduced Pressure) | | | |
| | | | | After Bond Durability Test | 27.4 | Longitudinal N=3 | 873 | 8866 | 90 | 3765 | — | — | — | 873 | 10 | 24 | — |
| Comparative Example 3 | Aspen 0.8mm | 140 | 8 | Normal State | 27.7 | Longitudinal N=3 | 827 | 9409 | 91 | 4800 | 5263 | 56 | 28.0 | 837 | 21 | 34 | 1.5 |
| | | | | | | Lateral N=3 | 762 | 3770 | 39 | 3186 | 2268 | 60 | 12.4 | Bond Durability Test (Warm Water and Reduced Pressure) | | | |
| | | | | After Bond Durability Test | 28.2 | Longitudinal N=3 | 821 | 8454 | 81 | 3613 | 4579 | 54 | 24.3 | 821 | 10 | 24 | — |

FIG.19

|  | Density [kg/m³] | | Pmax [N] | | Nail Pull Resistance [N/mm] | |
|---|---|---|---|---|---|---|
| Example 4 | 811 | 816 | 3051 | | 122 | 120 |
| | 818 | | 3198 | | 128 | |
| | 818 | | 2780 | | 111 | |
| Comparative Example 4 | 860 | 859 | 2538 | | 102 | 100 |
| | 849 | | 2590 | | 104 | |
| | 867 | | 2496 | | 100 | |
| | 863 | | 2398 | | 96 | |

WOOD LAMINATE MATERIAL AND METHOD FOR MANUFACTURING SAME

TECHNICAL FIELD

The present invention relates to wood laminate materials that are formed by stacking and laminating multiple wood-based material layers each formed by a woodbased material or woodbased materials, and methods for manufacturing the same.

BACKGROUND ART

Today there are less and less tropical hardwood species including broadleaf tress such as apitong and keruing, and it is difficult to obtain high-quality veneer at low cost. Degradation in quality of plywood using tropical hardwood species has therefore become a big problem. Wood fiberboards such as oriented strand boards (OSBs) are increasingly used as a substitute material for plywood. However, OSBs with common densities do not provide sufficient strength.

Conventionally, Patent Document 1, for example, discloses a large OSB plate having a density of at most 700 kg/m$^3$, a length of at least 7 m, and a flexural modulus of at least 7000 N/mm$^2$ in the primary load direction.

Patent Document 2 discloses a technique of using a strand material, which is formed by orienting and stacking woodbased material pieces and compressing and heating the stack, for joists, foundations, etc.

CITATION LIST

Patent Document

PATENT DOCUMENT 1: Japanese Patent No. 4307992
PATENT DOCUMENT 2: Japanese Patent No. 4227864

SUMMARY OF THE INVENTION

Technical Problem

In the OSB plate of Patent Document 1, a press pressure higher than common pressures is required to form a board. This OSB plate therefore cannot be formed without using a special press machine.

The inventors found that a board formed at a press pressure higher than common pressures with a special press machine as described above has uneven density distribution in the thickness direction of the boards. A board having uneven density distribution tends to be weak in its low-density portion. Moreover, the low-density portion of the board is more water absorbent and thus has lower water resistance as compared to a high-density portion of the board. With such uneven density distribution, strength and water resistance are governed by the low-density portion, and sufficient strength and water resistance cannot be obtained.

High strength and high water resistance can be achieved by using layers with a high density as all of woodbased material layers of a wood laminate material that is a laminate of woodbased materials such as strands.

In this case, however, it takes a lot of time and effort to increase the density of all of the multiple woodbased material layers of the wood laminate material, and reduction in productivity is therefore unavoidable. Moreover, since all of the woodbased material layers have a high density, characteristics as the wood laminate material are always the same, and it is difficult to vary characteristics of the wood laminate material for various applications.

It is an object of the present invention to allow a wood laminate material, which is a laminate of multiple woodbased materials, to have high strength and high water resistance by adjusting density distribution in the lamination direction, namely the direction in which the woodbased materials are laminated. It is another object of the present invention to prevent reduction in productivity for manufacturing wood laminate materials and make it possible to vary characteristics of the wood laminate materials while achieving a certain level of strength and water resistance of the wood laminate materials.

Solution to the Problem

In order to achieve the above objects, in the present invention, a wood laminate material is formed so as to have substantially constant density distribution in the lamination direction, thereby improving strength and water resistance of the wood laminate material.

Specifically, in the present invention, a wood laminate material formed by stacking and laminating multiple woodbased material layers each formed by laminated woodbased materials that are laminated multiple cut pieces or a woodbased material that is a veneer is characterized by having substantially constant density distribution in a lamination direction of the woodbased material layers.

According to this configuration, the wood laminate material has substantially constant density distribution in the lamination direction. As described above, if the wood laminate material has uneven density distribution in the lamination direction, strength and water resistance of the wood laminate material are governed by a low-density portion. However, the wood laminate material according to the present invention does not have such a problem. A wood laminate material with high strength and high water resistance is thus implemented.

In the above configuration, the woodbased material may have a density of 300 kg/m$^3$ or more and 1100 kg/m$^3$ or less, and preferably 300 kg/m$^3$ or more and 800 kg/m$^3$.

Since the woodbased material has a density of 300 kg/m$^3$ or more, the thickness of a stack of woodbased material layers (the thickness of the stack before being laminated) required to form a wood laminate material with the same density and strength can be reduced. Since the thickness of the stack can be reduced, workability of processes associated with lamination (e.g., a stacking process and a forming process) is improved. Moreover, a pressure for lamination which is required to form a wood laminate material with the same density and strength can be reduced.

The multiple woodbased material layers may be composed so that a thickness of the woodbased material layer gradually increases from the middle woodbased material layer in the lamination direction of the wood laminate material to the top and bottom woodbased material layers.

The outer layers that are more likely to be subjected to load and impact and are more susceptible to humidity etc. thus have a larger thickness than the inner layer(s). This allows the wood laminate layer to have improved performance regarding influences from the external environment.

In the present invention, not all of the woodbased material layers of the wood laminate material have a high density, but only a part of the woodbased material layers has a high density. High strength, high water resistance, etc. of the wood laminate material are thus implemented by the woodbased material layer with a high density.

Specifically, a wood laminate material formed by stacking and laminating multiple woodbased material layers each formed by laminated woodbased materials that are laminated multiple cut pieces or a woodbased material that is a veneer is characterized in that the multiple woodbased material layers include at least one high-density woodbased material layer, the remainder of the multiple woodbased material layers is a low-density woodbased material layer, and the high-density woodbased material layer has a higher density than the low-density woodbased material layer. As used herein, the "density of the woodbased material layer" refers to the density of a mat of cut pieces in the case where the woodbased materials are cut pieces, and refers to the density of a veneer if the woodbased material is a veneer.

In this configuration, at least one of the multiple woodbased material layers is a high-density woodbased material layer, and the remainder of the woodbased material layers is a low-density woodbased material layer. High strength and high water resistance of the wood laminate material are thus implemented by the high-density woodbased material layer.

In the case where the density of the woodbased material layer is increased, the density of the woodbased material need be increased only in the woodbased material layer required to have a high density, and it is not necessary to increase the density of the woodbased material in all the woodbased material layers. Press time with a press machine is therefore reduced accordingly and the pressure to be used is also reduced. This improves productivity and reduces or eliminates the risk of delamination when forming the wood laminate material.

Moreover, since at least one of the woodbased material layers is a high-density woodbased material layer, the layer (s) to be used as a high-density woodbased material layer can be selected as necessary from the multiple woodbased material layers. Characteristics of the wood laminate material can thus be varied as desired by changing the position(s) of the high-density woodbased material layer(s).

In the above configuration, the woodbased material layers located at both ends in the lamination direction of the woodbased material layers may be the high-density woodbased material layers.

In this case, the woodbased material layers located at both ends in the lamination direction are the high-density woodbased material layers and have a higher density than the woodbased material layer(s) located in the remaining part. This improves flexural strength of the wood laminate material and also improves water resistance of the top and bottom parts of the wood laminate material.

The woodbased material layer located in an intermediate part in the lamination direction of the woodbased material layers may be the high-density woodbased material layer.

In this case, as opposed to the case described above, the woodbased material layer located in the intermediate part in the lamination direction of the woodbased material layers is the high-density woodbased material layer and has a higher density than the woodbased material layers located in the remaining part (at both ends in the lamination direction of the woodbased material layers). The density in the intermediate part is therefore increased. This allows the wood laminate material to have uniform density distribution in the lamination direction. Moreover, since the wood laminate material has the high-density woodbased material layer in its intermediate part in the thickness direction and the top and bottom parts of the wood laminate material have a low density, the risk of delamination when forming the wood laminate material is effectively reduced or eliminated and productivity is improved.

The woodbased material layer located in a part other than the ends and a middle part in the lamination direction of the woodbased material layers may be the high-density woodbased material layer.

In this configuration, the woodbased material layer located in the part other than the ends and the middle part in the lamination direction of the woodbased material layers is the high-density woodbased material layer, and the woodbased material layers located at the ends and in the middle part in the lamination direction have a low density. The pressure to be used to form the wood laminate material is thus reduced by the low-density woodbased material layers in the top and bottom parts of the wood laminate material, and nail pull resistance (force) of the wood laminate material is increased by the high-density woodbased material layer.

Fibers of the woodbased materials may extend in the same direction in each woodbased material layer, and the fibers of the woodbased materials in adjoining ones of the woodbased material layers may extend in directions crossing or parallel to each other.

As used herein, the expressions "fibers extend in the same direction" and "fibers extend in directions parallel to each other" are not limited to the case where the fibers of all the woodbased materials are oriented in the same direction, but define a concept including the case where the fibers of a part of the woodbased materials are tilted to some extent. The fibers of a part of the woodbased materials may be tilted by, e.g., about 20° with respect to a predetermined reference direction. Similarly, the expression "fibers extend in directions crossing each other" is not limited to the case where the fibers are oriented in directions perpendicular to each other. The fibers of a part of the woodbased materials may be tilted by, e.g., about 20° with respect to a direction perpendicular to the reference direction.

According to this configuration, in the case where the fibers of the woodbased materials in adjoining ones of the woodbased material layers extend in directions crossing each other, the wood laminate material has high strength against forces acting in various directions, as compared to the case where the fibers extend in the same direction in all of the woodbased material layers. Especially, the larger the number of woodbased material layers is, the more significant the difference in strength due to the difference in fiber direction between the woodbased material layers is. In the case where the fibers are oriented in the same direction along the entire thickness in the lamination direction of the wood laminate material, the strength may vary depending on the direction in which a force is applied. However, this problem does not occur in the case where the fibers of the woodbased materials in adjoining ones of the woodbased material layers extend in directions crossing each other.

On the other hand, in the case where the fibers of the woodbased materials in adjoining ones of the woodbased material layers extend in directions parallel to each other, namely in the case where the fiber directions of the woodbased materials are the same along the entire thickness in the lamination direction of the wood laminate material, the wood laminate material has high strength against a force acting in a specific direction.

Of the multiple woodbased material layers, the fibers of the woodbased materials in the top and bottom woodbased material layers may extend in the same direction.

Performance such as load resistance and impact resistance in the top part of the wood laminate material is therefore about the same as that in the bottom part of the wood laminate material. That is, this configuration allows the wood laminate material to have similar performance in its top and bottom parts. This is advantageous in that the user can use the wood laminate material without having to worry about which side is the top and which side is the bottom.

The number of woodbased material layers may be odd. In this case, the wood laminate material is a laminate of the odd number of woodbased material layers. This configuration allows the wood laminate material to have similar performance in its top and bottom parts, as in the case described above.

The multiple woodbased material layers may be laminated so that overall density distribution provided by the multiple woodbased material layers is plane symmetric with respect to a center in the lamination direction. Since the overall density distribution provided by the multiple woodbased material layers is plane symmetric with respect to the center in the lamination direction, the wood laminate material has similar performance in its top and bottom parts. The user can therefore use the wood laminate material without having to know which side is the top and which side is the bottom.

The woodbased materials may be strands that are cut pieces. This implements a strand material having high strength and high water resistance or a strand material having high productivity and varied characteristics.

A method for manufacturing a wood laminate material is characterized by including: a stacking step of stacking multiple woodbased materials, which are cut pieces or veneers, to form multiple woodbased material layers so that at least one of the multiple woodbased material layers is formed by a high-density woodbased material or high-density woodbased materials having a relatively higher density than the remainder of the woodbased material layers; and a forming step of compressing or compacting the multiple woodbased material layers formed in the stacking step.

Since the woodbased material layers include a layer formed by the high-density woodbased material or high-density woodbased materials having a relatively higher density than the remainder of the woodbased material layers, density distribution in the lamination direction after the forming step can be adjusted, whereby a wood laminate material with desired characteristics can be produced. For example, density distribution in the lamination direction of the wood laminate material can be made substantially constant by inserting the woodbased material layer formed by the high-density woodbased material or high-density woodbased materials at an optimal position.

Advantages of the Invention

As described above, according to the present invention, density distribution in the lamination direction of the wood laminate material, which is formed by stacking and laminating multiple woodbased material layers each formed by cut pieces or veneer, is adjusted so that the wood laminate material has substantially constant density distribution in the lamination direction. High strength and high water resistance can therefore be achieved. Moreover, the density distribution in the lamination direction is varied so that at least one of the multiple woodbased material layers is a high-density woodbased material layer having a higher density than the remainder of the woodbased material layers. Accordingly, only the woodbased material layer required to have high strength and high water resistance has a high density, and productivity is improved. Moreover, characteristics of the wood laminate material can be varied as desired by changing the layer that is to be a high-density woodbased material layer.

BRIEF DESCRIPTION OF THE DRAWINGS

FIG. 9 is a table illustrating specific configurations of the first to sixth examples of the strand board according to the second embodiment.

FIG. 11 is a table showing the test results of Examples 1, 2 and Comparative Examples 1, 2.

FIG. 12 is a graph showing density distribution in the strand board of Example 1 according to the first embodiment, in which the uniform short-dashed line represents an average density of the woodbased material layers in the thickness direction (lamination direction) and the long-dash short-dash line represents a constant density value for reference.

FIG. 13 is a graph showing density distribution in a strand board of Comparative Example 1 as compared to the first embodiment, in which the uniform short-dashed line represents an average density of the woodbased material layers in the thickness direction (lamination direction) and the long-dash short-dash line represents a constant density value for reference.

FIG. 16 is a table showing the results of a bending test and a boiling test for Example 3 and Comparative Example 2, along with theft other physical properties.

FIG. 18 is a table showing the results of a bending test and a boiling test for Example 4 and Comparative Example 3, along with their other physical properties.

FIG. 19 is a table showing the result of a nail pull test for Example 4 and Comparative Example 4, along with their other physical properties.

DESCRIPTION OF EMBODIMENTS

Embodiments of the present invention will be described in detail below with reference to the accompanying drawings. The following description of the preferred embodiments is merely exemplary in nature and is not intended in any way to limit the invention, its applications or uses. Specific numerical values in the embodiments are shown merely by way of example in order to facilitate understanding of the invention and are not intended to limit the scope of the invention and materials of the invention.

First Embodiment

Figure 1:
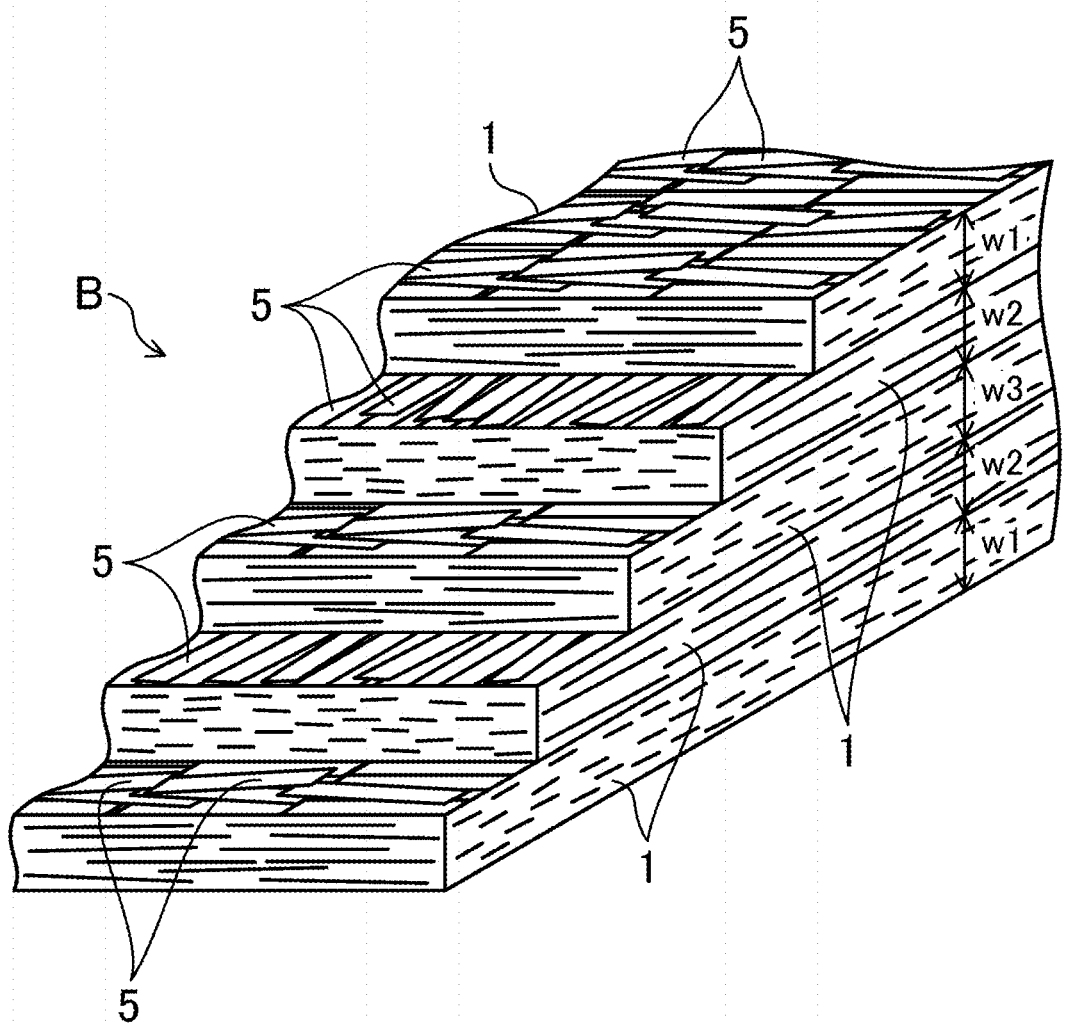
FIG. 1 is a schematic perspective view of a multi-layered structure of a strand board according to a first embodiment of the present invention.

FIG. 1 schematically shows a strand board B as a wood laminate material according to a first embodiment of the present invention.

As shown in FIG. 1, the strand board B has an odd number of (in FIG. 1, five) strand layers 1, 1, . . . as woodbased material layers, and all of the strand layers 1, 1, . . . have the same thickness. That is, FIG. 1 shows an example in which, with the upper side in FIG. 1 being the top and the lower side being the bottom, the thickness w1 of the top and bottom strand layers 1, 1 is the same as the thicknesses w2, w3, w2 of the three intermediate strand layers 1, 1, . . . . The strand board B need not necessarily have an odd number of strand layers 1. The strand board B may have an even number of strand layers 1. The number of strand layers 1 is not limited to five. The number of strand layers 1 may be four or less or six or more.

Each strand layer 1 is a mat made of laminated multiple strands 5, 5, . . . (woodbased materials) that are cut pieces of wood etc. Multiple mats of strands 5, 5, . . . are stacked together to form multiple strand layers 1, 1, . . . .

For example, the strands 5 are strands or flakes that are about 150 to 200 millimeters long in the fiber direction, about 15 to 25 millimeters wide, and about 0.3 to 2 millimeters thick.

Wood species that are used for the strands 5 are not particularly limited. For example, tropical wood species or broadleaf trees may be used, or other wood species may be used. Specific examples include Cedar (*Cryptomeria japonica*), Cypress (*Chamaecyparis*), sort of first such as Douglas fir (*Pseudotsuga menziesii*), Acacia (*Acacia* spp.), Aspen (*Populus* spp.), Poplar (*Populus* spp.), Pine (*Pinus* spp.) (Hard pine (*Pinus* spp.), Soft pine (*Pinus* spp.), Radiata pine (*Pinus radiata*), etc.), Birch (*Betula* spp.), and Rubber tree (Rubber wood (*Hevea brasiliensis*)). However, the wood species that are used for the strands 5 are not limited to these, and various other wood species may be used. Examples of the various other wood species include: Japanese wood species such as Sawara cypress (*Chamaecyparis pisifera*), Japanese elkhorn cypress (*Thujopsis dolabrata*), Japanese nutmeg-yew (*Torreya nucifera*), Southern Japanese hemlock (*Tsuga sieboldii*), Podocarp (*Podocarpus macrophyllus*), *Pinus* spp., Princess tree (*Paulownia tomentosa*), Maple (*Acer* spp.), Birch (*Betula* spp.) (Japanese white birch (*Betula platyphylla*)), Chinquapin (*Castanopsis* spp.), Japanese beech (*Fagus* spp.), Live oak (*Quercus* spp.), *Abies firma*, Sawtooth oak (*Quercus acutissima*), Oak (*Quercus* spp.), Camphor tree (*Cinnamomum camphora*), and Japanese zelkova (*Zelkova serrata*); North American wood species such as Port Orford cedar (*Chamaecyparis lawsoniana*), Yellow cedar (*Callitropsis nootkatensis*), Western redcedar (*Thuja plicata*), Grand fir (*A. grandis*), Noble fir (*A. procera*), White fir (*A. concolor*), Spruce (*Picea* spp.), Western hemlock (*Tsuga heterophylla*), and Scots pine (*Pinus sylvestris*); tropical hardwood species such as Agathis (*Agathis* spp.), Terminalia (*Terminalia* spp.), Lauan (*Shorea* spp.), Meranti (*Shorea* sect.), Sengon laut (*A. falcataria*), Jongkong (*Dactylocladus stenostachys*), Kamerere (*Eucalyptus deglupta*), Kalampayan (*Anthocephalus chinensis*), Amberoi (*Pterocymbium beccarii*), Yemane (*Gmelina arborea*), Teak (*Tectona grandis*), and Apitong (*Dipterocarpus* spp.); and other foreign wood species such as Balsa (*Ochroma pyramidale*), Cedro (*Cedrela odorata*), Mahogany (*Swietenia* spp.), Lignum-vitae (*Guaiacum* spp.), *Acacia mangium*, Aleppo pine (*Pinus halepensis*), Bamboo, Sorghum (*Sorghum nervosum* Bess.), and Kamerere (*Eucalyptus deglupta*). Any material can be used.

Regarding physical properties of the strands 5, the strands 5 preferably have a density of about 300 to 800 kg/m$^3$, more preferably 430 to 700 kg/m$^3$. If the density is less than 300 kg/m$^3$, a multi-layered mat with a larger thickness is required to form a strand board B of the same density and strength, and a higher pressure need be used for hot pressing in a press process described later.

The strands 5 may have a density higher than 800 kg/m$^3$, but it is difficult to obtain such strands 5. Namely, if strands 5 having a density higher than 800 kg/m$^3$ can be easily obtained, the upper limit of the density is not limited to 800 kg/m$^3$ and may be higher than 800 kg/m$^3$.

The moisture content of each strand 5 is preferably about 2 to 20%, more preferably 2 to 8%. If the moisture content is less than 2%, it takes more time to soften the strands 5 in the hot pressing of the press process. Namely, the press time is increased, which may cause reduction in strength.

If the moisture content of the strands 5 is higher than 20%, it takes more time to heat and compress the strands 5 in the hot pressing, and the strands 5 tend to be blown. Moreover, curing of an adhesive is inhibited, which may cause reduction in strength.

In each strand layer 1, the strands 5, 5, . . . are oriented such that the fiber direction (longitudinal direction of the strands 5), which is the direction in which fibers (not shown) of the strands 5, 5, . . . extend, is a predetermined direction. As also shown in FIG. 1, the fibers of the strands 5, 5, . . . in each strand layer 1 need not necessarily extend in exactly the same direction. In other words, the fiber directions of the oriented strands 5, 5, . . . do not have to be parallel to each other. Namely, the fiber directions of a part of the strands 5, 5, . . . may be tilted to some extent (e.g., by about 20°) with respect to a predetermined reference direction.

The multiple strand layers 1, 1, . . . are stacked and laminated such that the fibers of the strands 5, 5, . . . in adjoining ones of the strand layers 1 extend in directions perpendicular to each other. That is, in FIG. 1, the fiber direction of the strands 5, 5, . . . in the top strand layer 1 (uppermost layer in FIG. 1) is the same as that of the strands 5, 5, . . . in the bottom strand layer 1 (lowermost layer in FIG. 1).

The first embodiment is characterized in that the strand board B has substantially constant density distribution in the lamination direction of the strand layers 1 (the thickness direction of the strand board B), namely the direction in which the strand layers 1 are laminated. Specifically, the multiple strand layers 1, 1, . . . are laminated so that overall density distribution provided by the multiple strand layers 1, 1, . . . is plane symmetric with respect to the center in the lamination direction of the strand board B.

Next, a method for manufacturing a strand board B according to the first embodiment will be described. This manufacturing method includes a strand producing process, a strand pretreatment process, an adhesive coating process, a stacking process (mat forming process), and a press process.

Strand Producing Process

In the method for manufacturing a strand board B, the strand producing process is first performed in which a large number of strands 5, 5, . . . (cut pieces of wood etc.) are produced. In this process, green wood such as logs or thinnings is cut with, e.g., a cutting machine to produce strands 5, 5, . . . . The strands 5, 5, . . . may be produced from wood scraps, wood wastes, etc. that are generated at construction sites etc. or may be produced from waste wood pallets.

Strand Pretreatment Process

After the strand producing process, it is preferable that a large number of strands 5, 5, . . . produced be subjected to at least one of various strand pretreatment processes described below. This pretreatment is performed in order to allow low-pressure pressing using a pressure as low as, e.g., about 4 N/mm² to be performed in the later press process. At least one of a physical treatment method, a high-frequency treatment method, a high-temperature high-pressure treatment method, a high-water pressure treatment method, a repeated deaeration and dehydration treatment method, and a chemical treatment method is used.

The physical treatment method is a method in which the strands 5 are physically compressed. Examples of the physical treatment method include roll pressing, beating, and flat press pressing. The roll pressing is a linear compression method in which, although not shown in the figures, a large number of strands 5, 5, . . . (woodbased materials) are placed in a heat roll press machine such that the strands 5, 5, . . . evenly drop thereon, and the strands 5, 5, . . . are then compressed with heat. For example, this roll pressing is performed under the following conditions: heating temperature: room temperature to 200° C.; clearance between heat rolls: about 0.1 to 0.4 mm; feed rate: about 50 m/min; and compression ratio: about 20 to 60%. The strands 5 are thus compressed without being smashed, whereby high-density strands 5 are produced.

The beating is a point compression method in which, as in metal forging, strands 5 are compressed and deformed by hitting with multiple continuously installed spring hammers etc. As in the roll pressing, the strands 5 are thus compressed without being smashed, whereby high-density strands 5 are produced.

The flat press pressing is a surface compression method in which strands 5, 5, . . . (woodbased materials) are placed in a flat heat press machine and compressed with heat. For example, the flat press pressing is performed at a temperature of 120° C. and a pressure of about 4 N/mm² for about five minutes. In the flat press pressing as well, the strands 5 are compressed without being smashed, whereby high-density strands 5 are produced.

The high-frequency treatment method is a method in which strands 5 as dielectrics (nonconductors) are irradiated with high-frequency electromagnetic waves (high-frequency waves) between electrodes etc. and thus dielectrically heated from the inside and softened. This method allows low-pressure pressing using a low pressure to be performed in the later press process without increasing the density of the strands 5 as in the above physical treatment method.

The high-temperature high-pressure treatment method is a method in which strands 5 are placed in a pressure vessel where the strands 5 are subjected to high temperature and high pressure so that cell walls of the strands 5 (woodbased materials) are damaged and the strands 5 are softened. For example, this method is performed at a temperature of 180° C. and a pressure of about 10 Bar for about two minutes. This method also allows low-pressure pressing using a low pressure to be performed in the later press process without increasing the density of the strands 5 as in the above physical treatment method.

The high-water pressure treatment method is a method in which strands 5 are uniformly formed within a mesh material such as metal wire mesh and the surfaces of the strands 5 are finely scratched by high-pressure water of, e.g., about 200 MPa through the mesh material. This produces fine fractures in the strands 5. The softened strands 5 are thus obtained.

The repeated deaeration and dehydration treatment method is a method in which strands 5 are first saturated with water and then placed in a batch type of vessel, and with the vessel being evacuated to vacuum, moisture is removed from the strands 5 to facilitate damage to cell walls of the strands 5 (woodbased materials) and thus soften the strands 5. This method also allows low-pressure pressing using a low pressure to be performed in the later press process without increasing the density of the strands 5 as in the above physical treatment method.

The chemical treatment method is a method in which, for example, sodium hydroxide etc. is added to strands 5 for alkaline treatment to facilitate plasticization of the strands 5 themselves and thus soften the strands 5. This method also allows low-pressure pressing using a low pressure to be performed in the later press process without increasing the density of the strands 5 as in the above physical treatment method.

In the high-frequency treatment method, the high-temperature high-pressure treatment method, the high water pressure treatment method, the repeated deaeration and dehydration treatment method, and the chemical treatment method, the state of the strands 5 after the treatment is maintained by drying the strands 5 as necessary after the treatment.

Adhesive Coating Process

After a large number of strands 5, 5, . . . are thus produced, the adhesive coating process is performed in which the strands 5, 5, . . . are coated with an adhesive. For example, the adhesive may be an isocyanate adhesive or may be an amine adhesive such as a phenol resin, urea resin, or melamine resin.

Stacking Process

Thereafter, the stacking process (mat forming process) is performed in which a large number of strands 5, 5, . . . are oriented and stacked to form strand mats and the strand mats are stacked in multiple layers to form a multi-layered mat.

Specifically, with a mat forming machine etc., a large number of strands 5, 5, . . . coated with the adhesive are oriented such that fibers extend in a predetermined reference direction, and are stacked to a thickness of, e.g., about 7 to 12 mm to form a strand mat with a certain thickness. The thickness of the strand mat is not limited to the above values. The thickness of the strand mat may be less than 7 mm or more than 12 mm.

After the strand mat with a certain thickness is thus formed, strands 5, 5, . . . oriented such that the fiber direction of the strands 5, 5, . . . is, e.g., perpendicular to that of the strands 5, 5, . . . in the strand mat are stacked on top of the strand mat to form another strand mat with a certain thickness.

Subsequently, an additional strand mat is repeatedly stacked in a similar manner until the stack has a desired number of layers (e.g., five layers). At this time, the strand mats are stacked so that the fiber directions of the strands 5, 5, . . . in adjoining ones of the strand mats are perpendicular to each other. A multi-layered mat is formed in this manner. As shown in FIG. 1, in the case of the strand board B having the five strand layers 1, 1, . . . , the thickness of the five-layered mat is, e.g., about 35 to 60 mm.

The number of strand mats in the multi-layered mat is determined based on the number of layers in the strand board B. Accordingly, the number of strand mats in the multi-layered mat may be four or less or six or more.

The density of the strands 5, 5, . . . of the strand layer 1 may be either about the same or different between or among the multiple strand layers 1, 1, . . . .

(Press Process)

After the multi-layered mat is thus formed by stacking multiple strand mats, hot pressing is performed at a predetermined pressure and temperature with a hot press machine to compress or compact the multi-layered mat. This hot pressing is performed at a pressure of, e.g., 2 to 4 N/mm² for, e.g., about 10 to 20 minutes. The press time varies depending on the thickness of the strand board B (finished product). Accordingly, in some cases, it may take less than 10 minutes to complete the hot pressing, and in other cases, it may take 20 minutes or more to complete the hot pressing. Pre-heat treatment with a heater may be performed before the hot pressing with the hot press machine.

A strand board B having a density of 750 to 950 kg/m³ and flexural strength of 80 to 150 N/mm² is thus formed as a laminate by these processes.

In the first embodiment, the pressure for the hot pressing in the press process is as low as 2 to 4 N/mm². A high density, high strength strand board B can thus be produced without using a special high pressure press machine.

In the strand board B, the fiber direction of the strands 5, 5, . . . in the top strand layer 1 of the strand board B is the same as that of the strands 5, 5, . . . in the bottom strand layer 1 of the strand board B. Performance such as load resistance and impact resistance in the top part of the strand board B is therefore about the same as that in the bottom part of the strand board B. That is, this configuration allows the strand board B to have similar performance in its top and bottom parts. This is advantageous in that the user can use the strand board B without having to worry about which side is the top and which side is the bottom.

The multiple strand layers 1, 1, . . . have about the same thickness. This allows the strand board B to have uniform board performance such as strength properties and water resistance properties in the thickness direction.

Density distribution in the thickness direction of the strand board B formed by the strand layers 1, 1, . . . is plane symmetric. This allows the strand board B to have similar performance in its top and bottom parts. The user can therefore use the strand board B without having to know (worry about) which side is the top and which side is the bottom.

In the case where the number of strand layers 1, 1, . . . is odd, the strand board B has similar performance in its top and bottom parts, as described above.

As described above, it is preferable that the strands 5, 5, . . . produced in the strand producing process have a density of 430 to 700 kg/m³ and a moisture content of 2 to 20%. However, the strands 5, 5, . . . produced in the strand producing process can be used even if their properties are out of these preferred ranges.

Specifically, the strands 5, 5, . . . having desired properties may be separated from strands cut (or sliced) from logs by a screening machine etc., and the strands 5, 5, . . . thus separated may be subjected to the subsequent processes, namely the strand producing process, the strand pretreatment process, the adhesive coating process, the stacking process (mat forming process), and the press process.

The substantial moisture content and density of the strands 5, 5, . . . may be adjusted by changing, e.g., the composition, the coating method, etc. of the adhesive that is used in the adhesive coating process as desired. A predetermined pressing process may be performed, e.g., during or before the hot pressing in the press process. Specifically, a pressing process (including a compressed process) may be divided into in multiple stages to adjust the substantial moisture content of the strands 5, 5, . . . or increase the substantial density of the strands 5, 5, . . . for the hot pressing.

Second Embodiment

Figure 2:
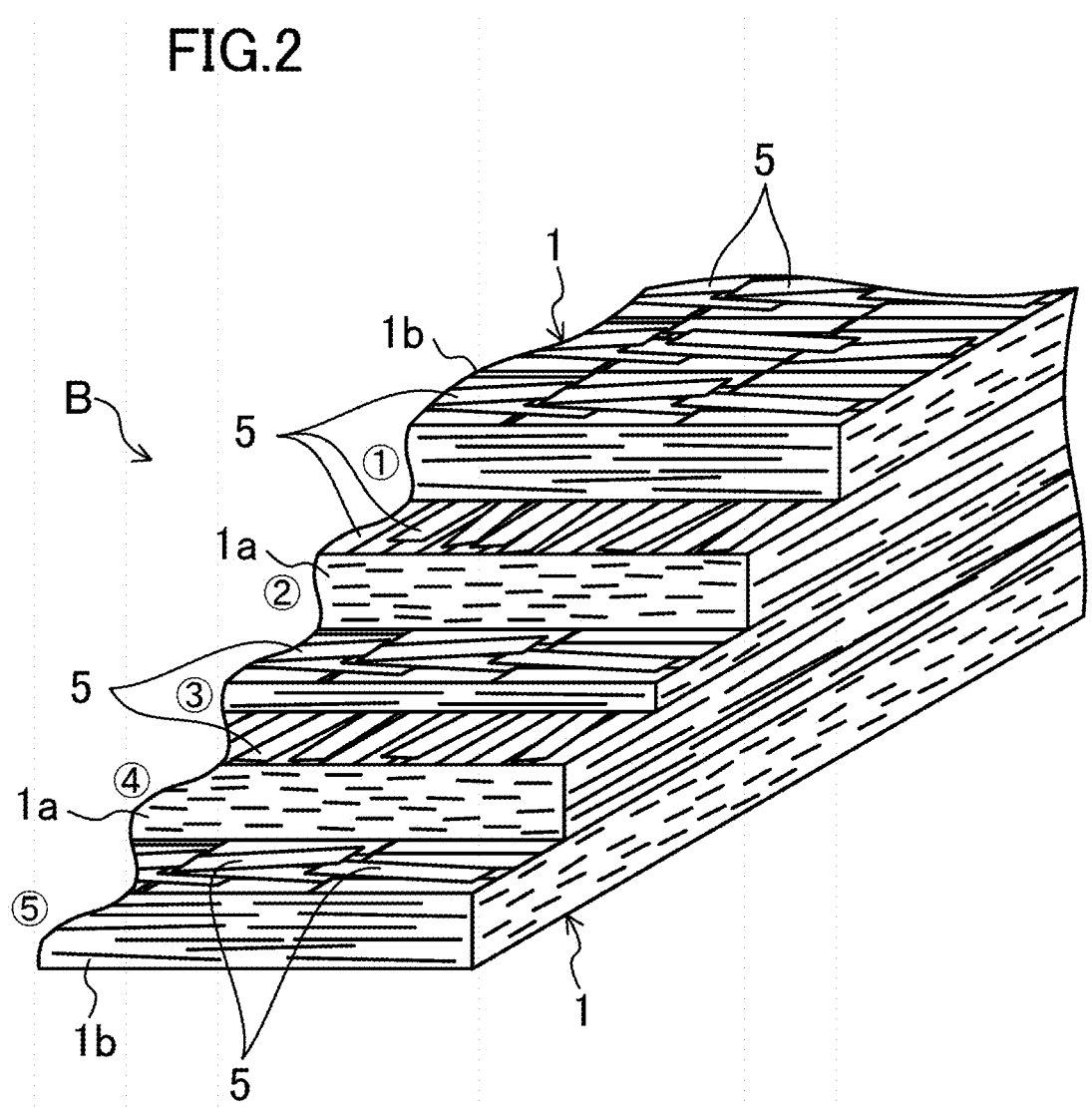
FIG. 2 is a schematic perspective view of a first example of a strand board according to a second embodiment of the present invention.
Figure 3:
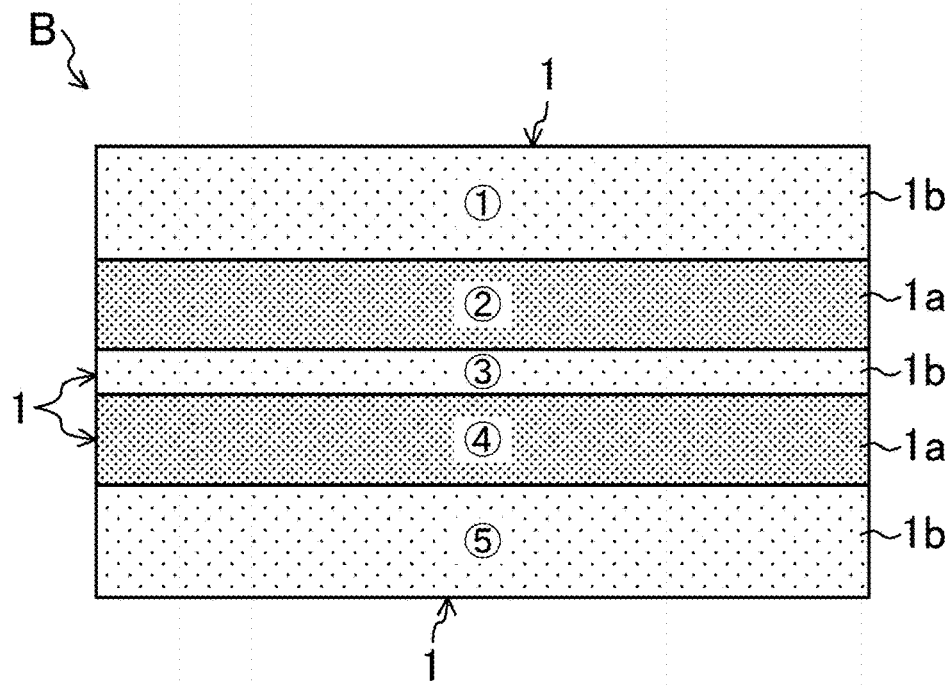
FIG. 3 is a schematic sectional view showing a laminate of strand layers in the first example of the strand board according to the second embodiment.
Figure 4:
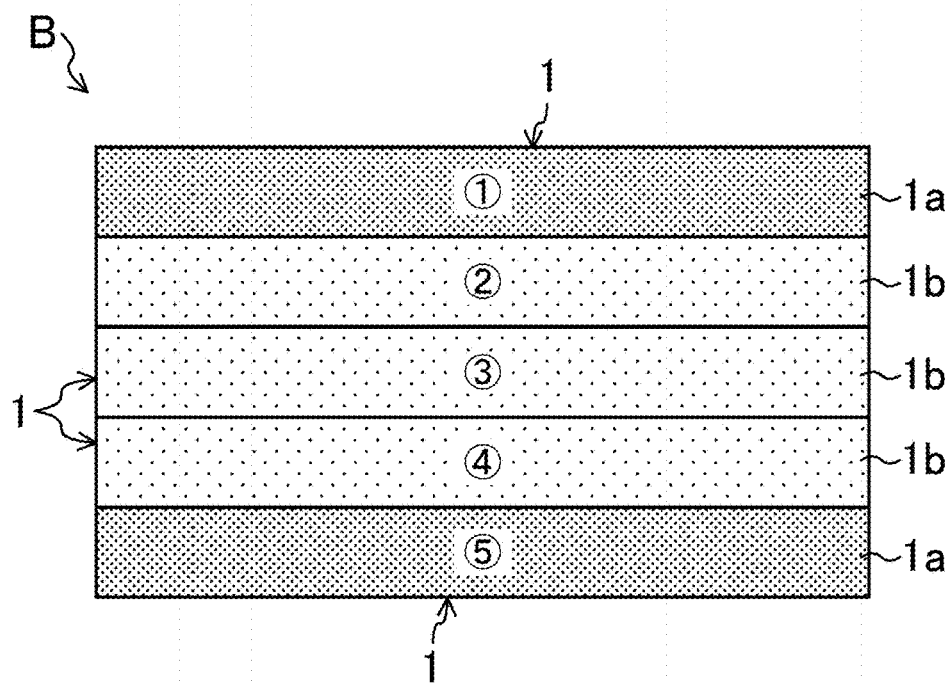
FIG. 4 is a sectional view corresponding to FIG. 3, showing a second example of the strand board according to the second embodiment.
Figure 5:
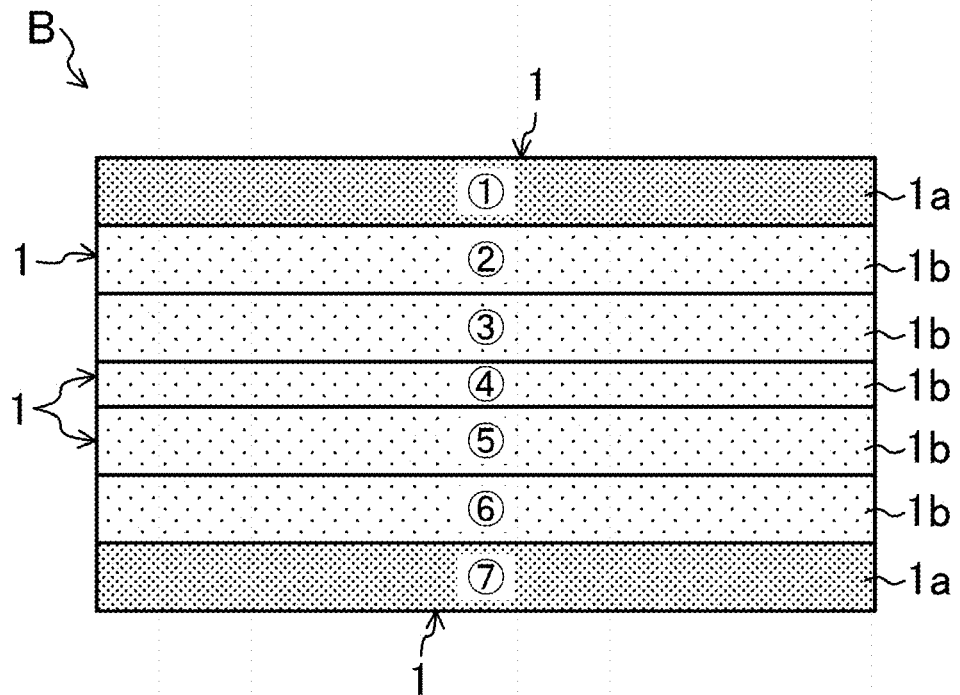
FIG. 5 is a sectional view corresponding to FIG. 3, showing a third example of the strand board according to the second embodiment.
Figure 6:
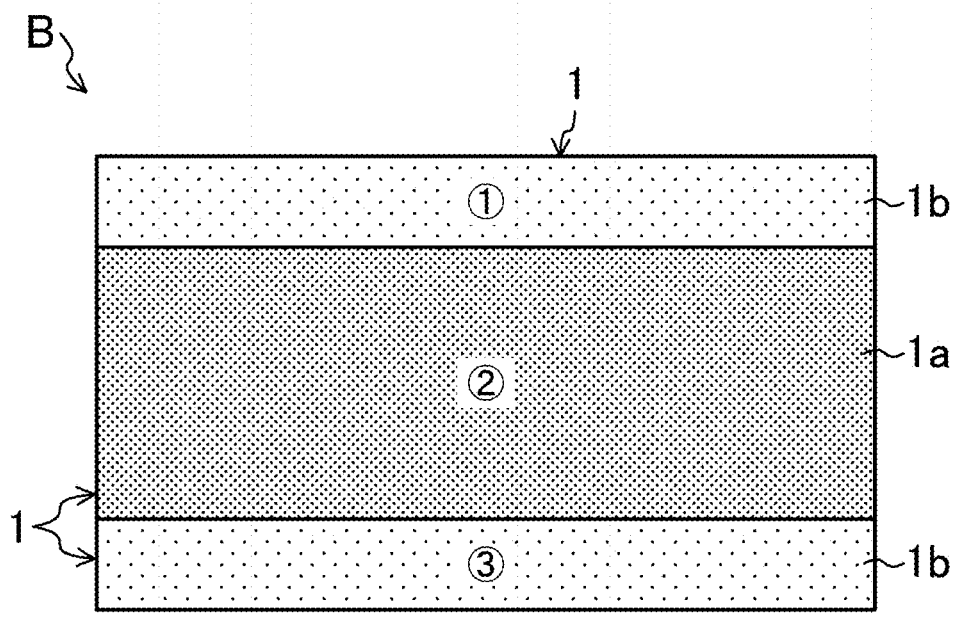
FIG. 6 is a sectional view corresponding to FIG. 3, showing a fourth example of the strand board according to the second embodiment.
Figure 7:
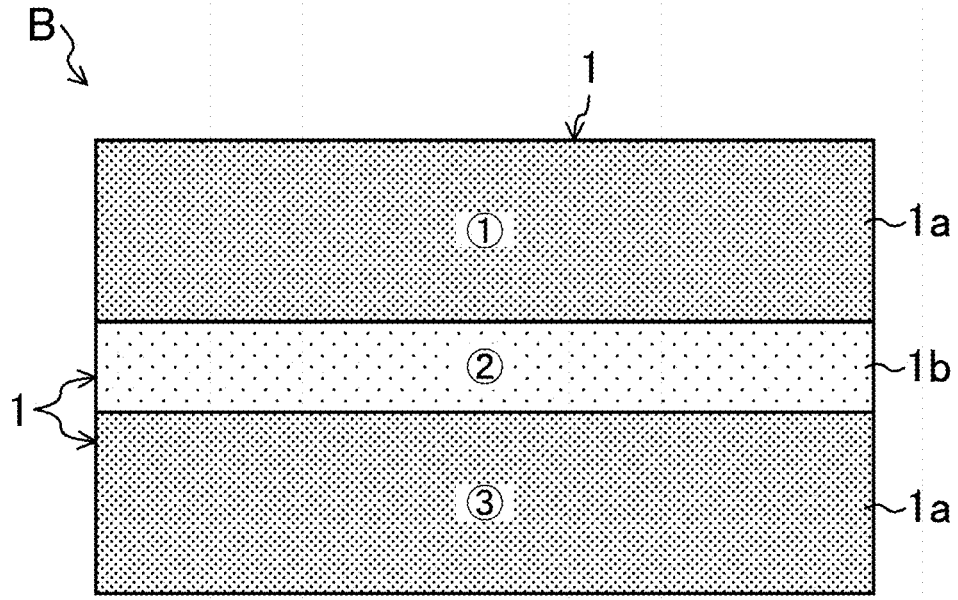
FIG. 7 is a sectional view corresponding to FIG. 3, showing a fifth example of the strand board according to the second embodiment.
Figure 8:
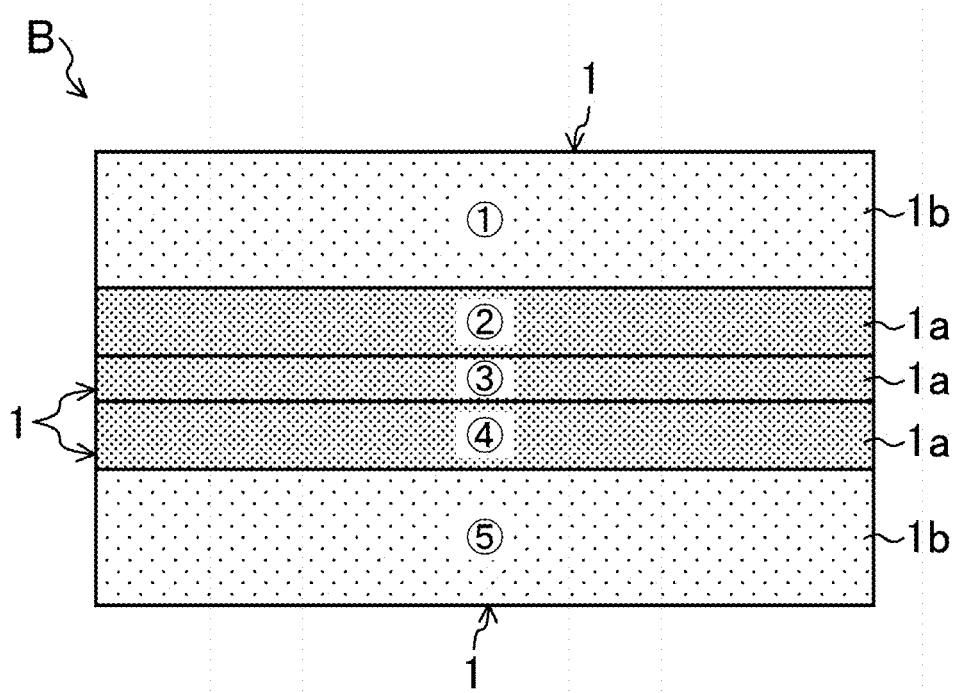
FIG. 8 is a sectional view corresponding to FIG. 3, showing a sixth example of the strand board according to the second embodiment.

FIGS. 2 to 8 shows a second embodiment of the present invention (the same portions as those in FIG. 1 are denoted with the same reference characters and detailed description thereof will omitted). FIGS. 2 to 8 show examples of a strand board B that is a wood laminate material according to the second embodiment. FIGS. 2 and 3 show a first example of the strand board B. FIG. 4 shows a second example, FIG. 5 shows a third example, FIG. 6 shows a fourth example, FIG. 7 shows a fifth example, and FIG. 8 shows a sixth example.

In each of the first to sixth examples, the strand board B includes strand layers 1, 1, . . . as multiple (an odd number of) woodbased material layers. Each strand layer 1 is made of a mat of a large number of strands 5, 5, . . . (woodbased materials) that are cut pieces. Multiple mats of strands 5, 5, . . . are stacked together to form multiple strand layers 1, 1, . . . .

In the second embodiment, the upper side in FIGS. 3 to 8 is the top of the strand board B and the lower side is the bottom thereof, and the strand layers 1, 1, . . . are sequentially numbered from top to bottom as the first strand layer 1, the second strand layer 1, the third strand layer 1, . . . . The strand layers 1, 1, . . . are thus marked with circled numbers in the FIGS. 3 to 8.

In the second embodiment, the strands 5 preferably have a density of about 300 to 1100 kg/m³. If the density is less than 300 kg/m³, a multi-layered mat with a larger thickness is required to form high-density strand layers 1a, and a higher pressure need be used for hot pressing in a press process.

The strands 5 may have a density higher than 1100 kg/m³, but it is difficult to obtain such strands 5. Namely, if strands 5 having a density higher than 1100 kg/m³ can be easily obtained, the upper limit of the density is not limited to 1100 kg/m³ and may be higher than 1100 kg/m³.

In the second embodiment as well, the strands 5, 5, . . . in each strand layer 1 are oriented such that the fibers of the strands 5, 5, . . . extend in a predetermined direction. As also shown in FIG. 2, the fibers of the strands 5, 5, . . . in each strand layer 1 need not necessarily extend in the same direction. Namely, the fiber directions of the oriented strands 5, 5, . . . in each strand layer 1 do not have to be parallel to each other. In other words, the fibers of a part of the strands 5, 5, . . . in each strand layer 1 may be tilted to some extent with respect to a predetermined reference direction. For example, a part of the strands 5, 5, . . . in each strand layer 1 may be oriented so as to be tilted by about 20° with respect to the reference direction.

The second embodiment is characterized in that, unlike in the first embodiment, at least one of the odd number of strand layers 1, 1, . . . in the strand board B is a high-density strand layer 1a having a density higher than the remaining strand layers 1b, and the remaining strand layers 1b are low-density strand layers. The "density of the strand layer" as used in the second embodiment does not refer to the density of the strands 5 but refers to the density of the strand layer 1 itself made of a mat of the strands 5.

Each example of the strand board B will be specifically described in detail. In FIGS. 3 to 8, the layers shaded with dense dots represent the high-density strand layers 1a and the layers shaded with sparse dots represent the low-density strand layers 1b.

First Example

FIGS. 2 and 3 show the first example of the strand board B according to the second embodiment. This strand board B has five strand layers, namely first to fifth strand layers 1, 1, . . . . These strand layers 1, 1, . . . are stacked and laminated such that the fibers of the strands 5, 5 in adjoining ones of the strand layers 1 extend in directions perpendicular to each other. The fiber direction of the strands 5, 5 in the first strand layer 1 located at the top of the strand board B, namely in the uppermost strand layer 1 in FIG. 3, is the same as that of the strands 5, 5 in the fifth strand layer 1 located at the bottom of the strand board B, namely in the lowermost strand layer 1 in FIG. 3.

Two of the five strand layers 1, 1, . . . are high-density strand layers 1a having a density higher than the other three strand layers, which are low-density strand layers 1b. The two high-density strand layers 1a, 1a have the same density, which is, e.g., about 1000 kg/m³ (average value). The three low-density strand layers 1b, 1b, . . . have the same density, which is, e.g., about 800 kg/m³. The density of these low-density strand layers 1b is about the same as that of common strand boards.

Specifically, the first strand layer 1 located at the top of the strand board B, the fifth strand layer 1 located at the bottom of the strand board B, and the third strand layer 1 located in the middle part in the thickness direction of the strand board B are low-density strand layers 1b. Both the second and fourth strand layers 1, 1 located in the parts of the strand board B other than the top and bottom and the middle part in the thickness direction of the strand board B are high-density strand layers 1a.

The five strand layers 1, 1, . . . have three different thicknesses. The thickness of each of the first and fifth strand layers 1, 1 (low-density strand layers 1b) is, e.g., 25% of the total thickness of the strand board B, the thickness of each of the second and fourth strand layers 1, 1 (high-density strand layers 1a) is, e.g., 20% of the total thickness of the strand board B, and the thickness of the third strand layer 1 (low-density strand layer 1b) is, e.g., 10% of the total thickness of the strand board B. The total thickness of the high-density strand layers 1a is therefore, e.g., 40% of the total thickness of the strand board B. The five strand layers 1, 1, . . . are laminated so that overall density distribution provided by the strand layers 1, 1, . . . is plane symmetric with respect to the center in the lamination direction, namely in the thickness direction, of the strand board B. The total thickness of the strand board B is, e.g., 28 mm.

A method for manufacturing a strand board B according to the second embodiment will be described. This manufacturing method is applied not only to the strand board B of the first example but also to the strand boards B of the second to sixth examples.

The manufacturing method of the second embodiment is basically the same as the first embodiment. Description of the same parts as those in the first embodiment is omitted, and only the differences will be described in detail.

This manufacturing method has a strand producing process, a strand pretreatment process, an adhesive coating process, a stacking process (mat forming process), and a press process. Of these processes, the strand pretreatment process, the adhesive coating process, and the press process are the same as those of the first embodiment.

In the second embodiment, when forming a multi-layered mat in the mat forming process by stacking another strand mat on top of a strand mat, the strand mat that is to be a high-density strand layer 1a is formed by the strands 5 having a density higher than the strands 5 of the strand mat that is to be a low-density strand layer 1b is. This allows both high-density and low-density strand layers 1a, 1b to be stacked together.

For example, the following two kinds of strands are prepared in advance in the first process of the manufacturing method, namely in the strand producing process: strands with densities in a common range; and strands with densities higher than the common range. The strands with densities in the common range are used as the strands 5 of the strand mat that is to be a low-density strand layer 1b. The strands with densities higher than the common range as a result of compression etc. may be used as the strands 5 of the strand mat that is to be a high-density strand layer 1a.

The wood species etc. of the strands 5 may be different between the strand mat that is to be a high-density strand layer 1a and the strand mat that is to be a low-density strand layer 1b. A wood species having a higher density may be used to produce the strands 5 of the strand mat that is to be a high-density strand layer 1a than a wood species that is used to produce the strands 5 of the strand mat that is to be a low-density layer strand layer 1b.

After the multi-layered mat is formed, the press process is performed in which hot pressing is performed at a predetermined pressure and temperature with a hot press machine to compress or compact the multi-layered mat. In the press process, the hot pressing is performed at a pressure of, e.g., 2 to 4 N/mm² as in the first embodiment, but the press time is, e.g., about 10 to 30 minutes. In the second embodiment as well, the press time varies depending on the thickness of the strand board B (finished product). Accordingly, in some cases, it may take less than 10 minutes to complete the hot pressing, and in other cases, it may take 30 minutes or more to complete the hot pressing. Pre-heat treatment with a heater may be performed before the hot pressing with the hot press machine.

As described above, it is preferable that the strands 5 produced in the strand producing process have a density of 300 to 1100 kg/m$^3$ and a moisture content of 2 to 8%. However, the strands 5 produced in the strand producing process can be used even if their properties are out of these preferred ranges.

Second Example

FIG. 4 shows the second example of the strand board B. As in the first example, this strand board B has five strand layers, namely first to fifth strand layers 1, 1, . . . . These strand layers 1, 1, . . . are stacked and laminated such that the fibers of the strands 5 in adjoining ones of the strand layers 1 extend in directions perpendicular to each other. The fiber direction of the strands 5, 5 in the first strand layer 1 located at the top of the strand board B, namely in the uppermost strand layer 1 in FIG. 4, is the same as that of the strands 5, 5 in the fifth strand layer 1 located at the bottom of the strand board B, namely in the lowermost strand layer 1 in FIG. 4.

Two of the five strand layers 1, 1, . . . are high-density strand layers 1a, and the other three strand layers are low-density strand layers 1b having a density lower than the high-density strand layers 1a. The two high-density strand layers 1a, 1a have the same density, which is, e.g., about 1100 kg/m$^3$ (average value). This density is higher than that of the high-density strand layers 1a of the first example. The three low-density strand layers 1b, 1b, . . . have the same density, and this density is lower than that of the low-density strand layers 1b of the first example (because the product density of the strand board B is lower than in the first example).

Unlike in the first example, the first strand layer 1 located at the top of the strand board B and the fifth strand layer 1 located at the bottom of the strand board B are high-density strand layers 1a. The remaining strand layers, namely the second to fourth strand layers 1, 1, . . . located in the intermediate part in the thickness direction of the strand board B, are low-density strand layers 1b.

The five strand layers 1, 1, . . . have the same thickness. The thickness of each strand layer 1 is, e.g., 20% of the total thickness of the strand board B. The total thickness of the high-density strand layers 1a is therefore, e.g., 40% of the total thickness of the strand board B. The five strand layers 1, 1, . . . are laminated so that overall density distribution provided by the strand layers 1, 1, . . . is plane symmetric with respect to the center in the thickness direction of the strand board B. The total thickness of the strand board B is, e.g., 9 mm.

Third Example

FIG. 5 shows the third example of the strand board B. Unlike in the second example, the strand board B has seven strand layers, namely first to seven strand layers 1, 1, . . . . These strand layers 1, 1, . . . are stacked and laminated such that the fibers of the strands 5 in adjoining ones of the strand layers 1 extend in directions perpendicular to each other. The fiber direction of the strands 5, 5 in the first strand layer 1 located at the top of the strand board B, namely in the uppermost strand layer 1 in FIG. 5, is the same as that of the strands 5, 5 in the seventh strand layer 1 located at the bottom of the strand board B, namely in the lowermost strand layer 1 in FIG. 5.

Two of the seven strand layers 1, 1, . . . are high-density strand layers 1a. The other five strand layers are low-density strand layers 1b having a density lower than the high-density strand layers 1a. The two high-density strand layers 1a, 1a have the same density, which is, e.g., about 1000 kg/m$^3$ (average value). This density is the same as that of the high-density strand layers 1a of the first example. The five low-density strand layers 1b, 1b, . . . have the same density, and this density is lower than that of the low-density strand layers 1b of the first example (because the product density of the strand board B is lower than in the first example).

Specifically, the first strand layer 1 located at the top of the strand board B and the seventh strand layer 1 located at the bottom of the strand board B are high-density strand layers 1a. The remaining strand layers, namely the second to sixth strand layers 1, 1, . . . located in the intermediate part in the thickness direction of the strand board B, are low-density strand layers 1b.

The seven strand layers 1, 1, . . . have two different thicknesses. The thickness of each of the first and seventh strand layers 1, 1 (high-density strand layers 1a) is, e.g., 15% of the total thickness of the strand board B, the thickness of each of the second, third, fifth, and sixth strand layers 1, 1, . . . (low-density strand layers 1b) is, e.g., 15% of the total thickness of the strand board B, and the thickness of the fourth strand layer 1 (low-density strand layer 1b) is, e.g., 10% of the total thickness of the strand board B. The total thickness of the high-density strand layers 1a is therefore, e.g., 30% of the total thickness of the strand board B. The seven strand layers 1, 1, . . . are laminated so that overall density distribution provided by the strand layers 1, 1, . . . is plane symmetric with respect to the center in the thickness direction of the strand board B. The total thickness of the strand board B is, e.g., 12 mm.

Fourth Example

FIG. 6 shows the fourth example of the strand board B. Unlike in the second and third examples, this strand board B has three strand layers, namely first to third strand layers 1, 1, . . . . These strand layers 1, 1, . . . are stacked and laminated such that the fibers of the strands 5 in adjoining ones of the strand layers 1 extend in directions perpendicular to each other. The fiber direction of the strands 5, 5 in the first strand layer 1 located at the top of the strand board B, namely in the uppermost strand layer 1 in FIG. 6, is the same as that of the strands 5, 5 in the third strand layer 1 located at the bottom of the strand board B, namely in the lowermost strand layer 1 in FIG. 6.

One of the three strand layers 1, 1, . . . is a high-density strand layer 1a. The other two strand layers are low-density strand layers 1b having a density lower than the high-density strand layer 1a. The density of the high-density strand layer 1a is, e.g., about 800 kg/m$^3$ (average value), which is lower than that of the high-density strand layers 1a of the second example. The two low-density strand layers 1b, 1b, . . . have the same density, and this density is the same as that of the low-density strand layers 1b of the first example.

Specifically, only the second strand layer 1 located in the middle part (intermediate part) in the thickness direction of the strand board B is a high-density strand layer 1a, and the first and third strand layers 1, 1 located at the top and bottom of the strand board B are low-density strand layers 1b.

The three strand layers 1, 1, . . . have two different thicknesses. The thickness of each of the first and third strand layers 1, 1 (low-density strand layers 1b) is, e.g., 20% of the total thickness of the strand board B, and the thickness of the second strand layer 1 (high-density strand layer 1a) is, e.g., 60% of the total thickness of the strand board B. The thickness of the high-density strand layer 1a is therefore, e.g., 60% of the total thickness of the strand board B. The three strand layers 1, 1, . . . are laminated so that overall density distribution provided by the strand layers 1, 1, . . . is plane symmetric with respect to the center in the thickness direction of the strand board B. The total thickness of the strand board B is, e.g., 18 mm.

Fifth Example

FIG. 7 shows the fifth example of the strand board B. As in the fourth example, this strand board B has three strand layers, namely first to third strand layers 1, 1, . . . . Unlike in the first to fourth examples, these strand layers 1, 1, . . . are stacked and laminated such that the fibers of the strands 5 in adjoining ones of the strand layers 1 extend in directions parallel to each other. That is, the fiber direction of the strands 5, 5 in the first strand layer 1 located at the top of the strand board B, namely in the uppermost strand layer 1 in FIG. 7, is the same as that of the strands 5, 5 in the third strand layer 1 located at the bottom of the strand board B, namely in the lowermost strand layer 1 in FIG. 7. The fiber direction of the strands 5, 5 in the second strand layer 1 located in the middle part in the thickness direction of the strand board B is also the same as that of the strands 5, 5 in the first and third strand layers 1.

Unlike in the fourth example, two of the three strand layers 1, 1, . . . are high-density strand layers 1a. The remaining one strand layer is a low-density strand layer 1b. The two high-density strand layers 1a, 1a have a density of, e.g., about 800 kg/m³ (average value). This density is the same as that of the high-density strand layer 1a of the fourth example. The density of the low-density strand layer 1b is lower than that of the low-density strand layers 1b of the first example (because the product density of the strand board B is lower than in the first example).

Specifically, the first and third strand layers 1, 1 located at the top and bottom of the strand board B are high-density strand layers 1a, and only the second strand layer 1 located in the middle part in the thickness direction of the strand board B is a low-density strand layer 1b.

The three strand layers 1, 1, . . . have two different thicknesses. The thickness of each of the first and third strand layers 1, 1 (high-density strand layers 1a) is, e.g., 40% of the total thickness of the strand board B, and the thickness of the second strand layer 1 (low-density strand layer 1b) is, e.g., 20% of the total thickness of the strand board B. The total thickness of the high-density strand layers 1a is therefore, e.g., 80% of the total thickness of the strand board B. The three strand layers 1, 1, . . . are laminated so that overall density distribution provided by the strand layers 1, 1, . . . is plane symmetric with respect to the center in the thickness direction of the strand board B. The total thickness of the strand board B is, e.g., 15 mm.

Sixth Example

FIG. 8 shows the sixth example of the strand board B. As in the first example, this strand board B has five strand layers, namely first to fifth strand layers 1, 1, . . . . These strand layers 1, 1, . . . are stacked and laminated such that the fibers of the strands 5 in adjoining ones of the strand layers 1 extend in directions perpendicular to each other. The fiber direction of the strands 5, 5 in the first strand layer 1 located at the top of the strand board B, namely in the uppermost strand layer 1 in FIG. 8, is the same as that of the strands 5, 5 in the fifth strand layer 1 located at the bottom of the strand board B, namely in the lowermost strand layer 1 in FIG. 8.

Three of the five strand layers 1, 1, . . . are high-density strand layers 1a. The other two strand layers are low-density strand layers 1b having a density lower than the high-density strand layers 1a. The three high-density strand layers 1a, 1a, . . . have the same density, which is, e.g., about 1000 kg/m³ (average value). This density is the same as that of the high-density strand layers 1a of the first example. The two low-density strand layers 1b, 1b, . . . have the same density. This density is the same as that of the low-density strand layers 1b of the first example.

Specifically, as opposed to the second example, the second to fourth strand layers 1, 1, . . . located in the intermediate part in the thickness direction of the strand board B are high-density strand layers 1a. The remaining strand layers, namely the first strand layer 1 located at the top of the strand board B and the fifth strand layer 1 located at the bottom of the strand board B, are low-density strand layers 1b.

The five strand layers 1, 1, . . . have three different thicknesses. The thickness of each of the first and fifth strand layers 1, 1 (low-density strand layers 1b) is, e.g., 30% of the total thickness of the strand board B, the thickness of each of the second and fourth strand layers 1, 1 (high-density strand layers 1a) is, e.g., 15% of the total thickness of the strand board B, and the thickness of the third strand layer 1 (high-density strand layer 1a) is, e.g., 10% of the total thickness of the strand board B. The total thickness of the high-density strand layers 1a is therefore, e.g., 60% of the total thickness of the strand board B. The five strand layers 1, 1, . . . are laminated so that overall density distribution provided by the strand layers 1, 1, . . . is plane symmetric with respect to the center in the thickness direction of the strand board B. The total thickness of the strand board B is, e.g., 28 mm.

FIG. 9 shows specific configurations of the first to sixth examples.

In the second embodiment, the strand board B has multiple strand layers 1, 1, . . . , and a part (one to three) of the multiple strand layers 1, 1, . . . is a high-density strand layer 1a having a density higher than the other strand layers 1, 1, . . . . The high-density strand layer 1a provides high strength and high water resistance of the strand board B, whereby the strand board B having high strength and high water resistance is obtained.

In the case where the density of the strand layer 1 is increased to use this strand layer 1 as a high-density strange layer 1a in the strand board B, the density of only the strands 5 of this high-density strand layer 1a need be increased, and it is not necessary to increase the density of the strands 5 of all the strand layers 1, 1, . . . . The press time with a press machine is therefore reduced accordingly and the pressure to be used is also reduced. This improves productivity and reduces or eliminates the risk of delamination in the press process.

Moreover, one to three of the odd number of strand layers 1, 1, . . . of the strand board B are high-density strand layers 1a. Accordingly, as shown in the first to sixth examples, a layer(s) to be used as a high-density strand layer(s) 1a can be selected from the multiple strand layers 1, 1, . . . as necessary. Characteristics of the strand board B can therefore be varied as desired by changing the position(s) of the high-density strand layer(s) 1a, so that the strand board B has advantageous effects specific to each example.

That is, in, e.g., the first example shown in FIGS. 2 and 3 (the sixth example shown in FIG. 8 is substantially similar to this configuration), the second and fourth strand layers 1, 1 located in the parts of the strand board B other than the top and bottom and the middle part in the thickness direction of the strand board B are high-density strand layers 1a, and the remaining layers, namely the first, third, and fifth strand layers 1, 1, . . . located at the top and bottom and in the middle part in the thickness direction of the strand board B, are low-density strand layers 1b. This structure is advantageous in that the use of the low-density strand layers 1b in the top and bottom parts reduces the pressure to be used in the press process and the high-density strand layers 1a provide increased nail pull resistance (force) for a nail that is a fastener to be driven into the strand board B. Especially, the sixth example shown in FIG. 8 further improves productivity.

In the second example shown in FIG. 4 and the third example shown in FIG. 5, the strand layers 1, 1 located at the top and bottom of the strand board B are high-density strand layers 1a, and the strand layers 1, 1, . . . located in the intermediate part of the strand board B are low-density strand layers 1b. In this structure, the high-density strand layers 1a in the top and bottom parts increase flexural strength of the strand board B and improve water resistance in the top and bottom parts of the strand board B.

In the fourth example shown in FIG. 6, the strand layer 1 located in the intermediate part in the thickness direction of the strand board B is a high-density strand layer 1a, and the strand layers 1, 1 located in the remaining part of the strand board B are low-density strand layers 1b. In this structure, the strand board B has a higher density in its intermediate part due to the high-density strand layer 1a, and the strand board B has uniform overall density distribution in the thickness direction. Since the high-density strand layer 1a is formed in the intermediate part in the thickness direction of the strand board B and the low-density strand layers 1b are formed in the top and bottom parts of the strand board B, this structure effectively reduces or eliminates the risk of delamination in the press process and improves productivity.

In the fifth example shown in FIG. 7, the strand layer 1 located in the middle part in the thickness direction of the strand board B is a high-density strand layer 1a, and the first and third strand layers 1, 1 located at the top and bottom of the strand board B are low-density strand layers 1b. Moreover, the fiber direction of the strands 5, 5, . . . is the same in all of the first to third strand layers 1, 1 . . . . This structure improves flexural strength in the fiber direction and also improves shear strength.

In the first to fourth examples of the strand board B of the second embodiment, the fibers of the strands 5, 5, . . . extend in the same direction in each strand layer 1, and the fibers of the strands 5 in adjoining ones of the strand layers 1 extend in directions perpendicular to each other. This structure has high strength against forces acting in various directions as compared to the case where the fibers of the strands 5 extend in the same direction in all of the strand layers 1, 1, . . . as in the fifth example. The larger the number of strand layers 1 is, the more significant the difference in strength of the strand board B due to the difference in fiber direction between the strand layers 1 is.

On the other hand, in the case where the strands 5, 5 are oriented in the same direction along the entire thickness in the lamination direction of the strand board B as in the fifth example, the strand board B has high strength against a force acting in a specific direction, as described above.

In the second embodiment as well, density distribution in the thickness direction of the strand board B formed by the strand layers 1, 1, . . . is plane symmetric. This allows the strand board B to have similar performance in its top and bottom parts. The user can therefore use the strand board B without having to know which side is the top and which side is the bottom.

Moreover, the strand board B has an odd number of strand layers 1, 1, . . . . This allows the strand board B to have similar performance in its top and bottom parts.

Other Embodiments

The present invention is not limited to the first and second embodiments. In the first embodiment, the thicknesses w1 to w3 of the multiple strand layer 1, 1, . . . are the same. However, the present invention is not limited to this, and the thicknesses W1 to W3 of each layer 1 can be set as desired.

For example, the multiple strand layers 1, 1, . . . may be composed so that the thickness of the strand layer 1 gradually increases from the middle strand layer 1 in the thickness direction (lamination direction) of the strand board B to the top and bottom strand layers 1. That is, the thicknesses of the multiple strand layers 1, 1, . . . in FIG. 1 may have a relation of w1>w2>w3. The strand layers 1 on the outer sides (top and bottom) of the strand board B, which are more likely to be subjected to load and impact and are more susceptible to humidity etc., have a larger thickness than the remaining strand layer(s) 1. This allows the strand board B to have improved performance regarding influences from the external environment.

One or more of the strand layers 1, 1, . . . may have a different thickness from the remaining strand layer(s) 1. For example, the thickness w1 of the top and bottom strand layers 1, 1 may be different from the thicknesses w2, w3 of the three intermediate strand layers 1, 1, . . . . Although not shown in the figures, all of the five strand layers 1, 1, . . . may have different thicknesses from each other.

In the first embodiment, the fiber direction of the strands 5, 5, . . . in every strand layer 1 is perpendicular to that of the strands 5, 5, . . . in its adjoining strand layer 1. However, the present invention is not limited to this. For example, the fiber direction of the strands 1, 1, . . . in a part of the multiple strand layers 1, 1, . . . may be the same as that of the strands 5, 5, . . . in its adjoining layer 1. For example, in the case where the strand layers 1, 1 that are different in form of the strands 5, 5, . . . such as length or density of the strands 5, 5, . . . from each other are formed so as to adjoin each other, the fiber directions of the strands 5, 5, . . . in these adjoining strand layers 1, 1 may be the same.

In the first embodiment, the density or thickness of the strands 5 (woodbased materials) may be different between or among the strand layers 1, 1, . . . of the strand board B.

For example, in the stacking process (mat forming process), the multiple mats of strands 5, 5, . . . may be stacked so that the relative density of the strands 5 of the mat gradually increases from the top and bottom strand layers 1 to the middle strand layer 1 in the thickness direction of the strand board B. When the multi-layered mat is pressed in the press process, the relative density of the outer strand layers 1 that are directly subjected to the pressure of a press machine typically tends to become higher than that of the inner strand layer(s) 1. Since the relative density of the strands 5 of the inner strand layer(s) 1 is thus made higher than that of the strands 5 of the outer strand layers 1 prior to the pressing, the strand board B formed by the pressing has uniform density distribution in the lamination direction. In this case, the wood species of the strands 5 may be different or the same between or among the strand layers 1.

That is, in a part of the strand layers 1 or all of the strand layers 1, the wood species, thickness, density, etc. of the strands 5 of the strand layer 1 can be selected as appropriate according to required characteristics, cost, etc.

In the stacking process (mat forming process) of the first embodiment, the strand mats may be stacked so that at least one of the multiple strand layers 1, 1, . . . is formed by the strands 5, 5, . . . with a high density. This strand layer 1 is a layer formed by the strands 5 having a relatively higher density than the other strand layers 1. Specifically, in the case where the strand board B has, e.g., an odd number of strand layers 1, the strand mats may be stacked so that an odd-numbered strand layer 1 from the top or bottom of the strand board B is formed by the high-density strands 5. The strand mats may be stacked so that a specific one (at least one) of the multiple strand layers 1, 1, . . . are formed by the high-density strands 5, 5, . . . according to, e.g., the use of the strand board B, required strength properties and other performance of the strand board B, etc. In the case where there are multiple strand layers 1 that are formed by the high-density strands 5, 5, . . . , these strand layers 1, 1, . . . may be different in density and thickness from each other.

In the second embodiment, the strand board B has an odd number of strand layers 1, 1, . . . . However, the strand board B may have an even number of strand layers 1. It is preferable that the strand board B have an odd number of strand layers 1, 1, . . . because this allows the strand board B to have similar performance in its top and bottom parts.

In the second embodiment, the fibers of the strands 5 extend in the same direction in each strand layers 1, and the fiber directions of the strands 5, 5 of adjoining ones of the strand layers 1 are either perpendicular or parallel to each other. However, the present invention is not limited to this. The fiber direction of the strands 5 of each strand layer 1 may be determined as desired.

The first and second embodiments are described with respect to the strand board B formed by stacking and laminating the mats of the strands 5 into the shape of a board. However, the present invention is not limited to this strand board B. For example, multiple strand layers having a rectangular section (in the shape of squared timber) and having no significant difference between their thickness and width may be stacked and laminated. In this case, a strand material (wood laminate material) can be used as a joist, pillar, etc. formed by stacking and laminating multiple strand layers.

The first and second embodiments are examples of the strand board B formed by stacking and laminating the multiple strand layers 1, 1, . . . each formed by laminated multiple strands 5, 5, . . . . However, the present invention is also applicable to, e.g., plywood and laminated veneer lumber (LVL). Specifically, veneers may be used instead of the mats of strands 5. That is, in the case of plywood and LVL, each woodbased material layer is formed by at least one veneer.

In the case where the wood laminate material is plywood or LVL, a common manufacturing method is used to manufacture plywood or LVL. Specifically, green wood such as logs or thinnings is cut with a cutting machine to produce veneers. Multiple veneers are then stacked together with an adhesive therebetween such that the fiber directions of adjoining ones of the veneers are the same in the case of LVL and the fiber directions of adjoining ones of the veneers are perpendicular to each other in the case of plywood. Subsequently, the staked veneers are formed by cold pressing or hot pressing to cure the adhesive.

In the case where density distribution in the lamination direction of the woodbased material layers is to be made substantially uniform as in the first embodiment, the density, thickness, etc. of each veneer are adjusted before, e.g., the stacked veneers are formed in the press process.

In the case where the woodbased material layers consist of a combination of high-density and low-density woodbased material layers as in the second embodiment, the density of the woodbased material or woodbased materials forming each woodbased material layer is made higher in a part of the woodbased material layers than in the remainder of the woodbased material layers by wood species etc. before, e.g., the stacked veneers are formed in the press process.

EXAMPLES

Next, specific examples of the strand boards according to the first and second embodiments will be described. It should be noted that "examples" and "comparative examples" of the first embodiment are different from "examples" and "comparative examples" of second embodiments even though their numbers are the same. The examples and the comparative examples are specified for each embodiment.

First Embodiment

Example 1

Mats of a large number of cypress strands were stacked into a multi-layered mat having five strand layers and a thickness of 37 mm. The strands were 150 to 200 mm long in the fiber direction, 15 to 25 mm wide, and 0.8 to 2 mm thick and had a density of 500 to 600 kg/m$^3$. The multi-layered mat was then subjected to hot pressing at 140° C. and 4 N/mm$^2$ for 10 minutes, whereby a strand board with a density of 818 kg/m$^3$ and a thickness of 12.4 mm was obtained. This strand board was used as Example 1.

Figure 10:
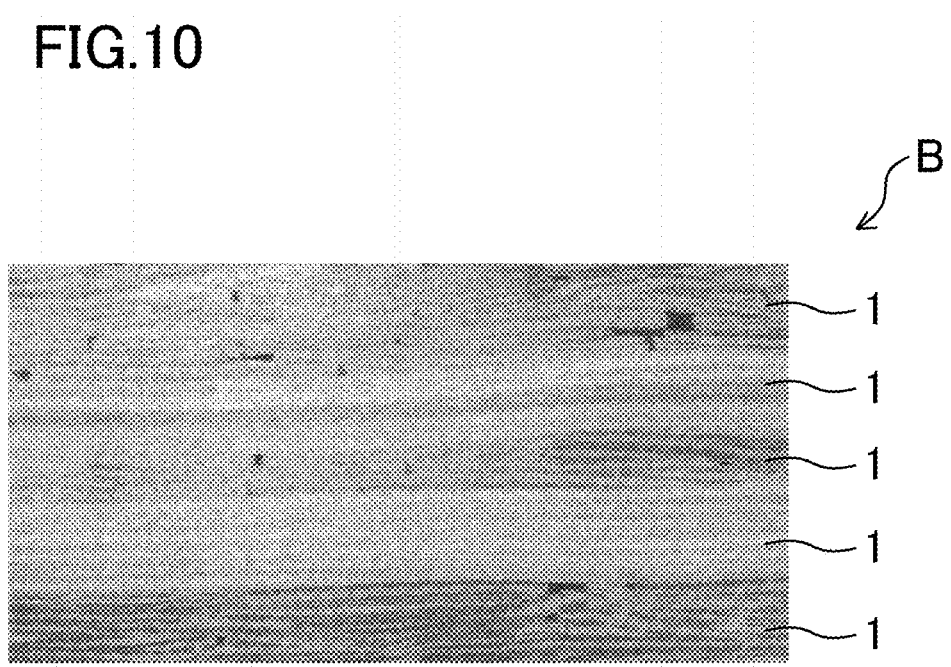
FIG. 10 is a sectional image of a strand board of Example 1 of the first embodiment.

FIG. 10 shows an image of Example 1. In FIG. 10, reference character "B" indicates the strand board and "1" indicates the strand layers. FIG. 11 shows the results of a bending test, a dimensional change test, and a water absorption test for Example 1. FIG. 12 shows the density distribution in the thickness direction (lamination direction) of the strand board measured with a density profile analyzer ("DENSE-LAB X" made by ELECTRONIC WOOD SYSTEMS GMBH).

Example 2

Mats of a large number of Douglas fir strands were stacked into a multi-layered mat having five strand layers and a thickness of 36 mm. The strands were 150 to 200 mm long in the fiber direction, 15 to 25 mm wide, and 0.8 to 2 mm thick and had a density of 450 to 550 kg/m$^3$. The multi-layered mat was then subjected to hot pressing at 140° C. and 4 N/mm$^2$ for 10 minutes, whereby a strand board with a density of 832 kg/m$^3$ and a thickness of 12.2 mm was obtained. This strand board was used as Example 2. FIG. 11 shows the results of the bending test, the dimensional change test, and the water absorption test for Example 2.

Comparative Example 1

Mats of a large number of cypress strands were stacked into a multi-layered mat having five strand layers and a thickness of 42 mm. The strands were 150 to 200 mm long in the fiber direction, 15 to 25 mm wide, and 0.8 to 2 mm thick and had a density of 400 to 500 kg/m$^3$. The multi-layered mat was then subjected to hot pressing at 140° C. and 8 N/mm$^2$ for 10 minutes, whereby a strand board with a density of 779 kg/m$^3$ and a thickness of 12.7 mm was obtained. This strand board was used as Comparative Example 1. FIG. 11 shows the results of the bending test, the dimensional change test, and the water absorption test for Comparative Example 1. FIG. 13 shows the density distribution in the thickness direction (lamination direction) of the strand board measured with the density profile analyzer ("DENSE-LAB X" made by ELECTRONIC WOOD SYSTEMS GMBH).

Comparative Example 2

Mats of a large number of Douglas fir strands were stacked into a multi-layered mat having five strand layers and a thickness of 35 mm. The strands were 150 to 200 mm long in the fiber direction, 15 to 25 mm wide, and 0.8 to 2 mm thick and had a density of 350 to 450 kg/m$^3$. The multi-layered mat was then subjected to hot pressing at 140° C. and 8 N/mm$^2$ for 10 minutes, whereby a strand board with a density of 812 kg/m$^3$ and a thickness of 12.4 mm was obtained. This strand board was used as Comparative Example 2. FIG. 11 shows the results of the bending test, the dimensional change test, and the water absorption test for Comparative Example 2

The results in FIG. 11 show that Example 1 is higher in density, flexural strength, modulus of rupture (MOR), and modulus of elasticity (MOE) than Comparative Example 1. Percentage dimensional change and water absorption of Example 1 are about the same as those of Comparative Example 1. Example 2 has a higher density than Comparative Example 2, approximately the same flexural strength and MOR as Comparative Example 2, and a higher MOE than Comparative Example 2. Percentage dimensional change and water absorption of Example 2 are about the same as those of Comparative Example 2.

The results in FIGS. 12 and 13 show that Example 1 has substantially constant density distribution in the lamination direction of the multiple strand layers as compared to Comparative Example 1. The substantially constant density distribution includes such density distribution that, in the case where the measurement result of the density distribution varies as shown in, e.g., FIGS. 12 and 13, the median shown by dashed line as shown in each figure does not vary significantly but is substantially constant. For example, as can be seen from comparison between the dashed line shown in FIG. 12 (Example 1) and the dashed line shown in FIG. 13 (Comparative Example 1), the median of the density distribution shown in FIG. 12 varies less than the median of the density distribution shown in FIG. 13, and the median of the density distribution shown in FIG. 12 is substantially constant.

Since the density distribution is substantially constant, the strand board has uniform density distribution and overall water resistance and strength (shear strength etc.) of the strand board are improved. Specifically, a portion with a low density has lower water resistance and strength than a portion with a high density. Accordingly, if the density distribution is uneven, the overall performance of the strand board is governed by the water resistance and strength of the portion with a low density. However, in the case where the density distribution is substantially constant, such a portion that becomes a bottleneck for performance can be eliminated.

The above bending test was conducted in accordance with IICL_Floor_Performance TB001 Ver. 2. The dimensional change test and the water absorption test were conducted in accordance with the cyclic boiling test of Japanese Agricultural Standard for plywood.

Second Embodiment

Example 1

Mats of a large number of aspen strands were stacked into a multi-layered mat having five strand layers and a thickness of 53 mm. The strands had a thickness of 0.8 mm and a density of 300 to 600 kg/m$^3$. As in the second example (see FIG. 4) of the strand board of the second embodiment, strands with common densities (average value: 393 kg/m$^3$) were used for the second to fourth strand layers located in the intermediate part in the lamination direction out of the five strand layers. Strands with higher densities (average value: 557 kg/m$^3$) than the common densities were used for the first and fifth strand layers located at both ends in the lamination direction.

The multi-layered mat was then subjected to hot pressing at 160° C. and 4 N/mm$^2$ for 8 minutes. The strand board thus obtained was used as Example 1. The time required to achieve a target thickness, namely the time required to press the multi-layered mat to a target thickness, was 24 seconds.

Example 2

A multi-layered mat having five strand layers and a thickness of 52 mm was formed in a manner similar to that in Example 1. Strands having a density (average value: 805 kg/m$^3$) higher than Example 1 were used for the first and fifth strand layers located at both ends in the lamination direction out of the five strand layers. The multi-layered mat was then subjected to hot pressing under conditions similar to those in Example 1. The strand board thus obtained was used as Example 2. The time required to achieve a target thickness was 12 seconds. Example 2 is otherwise the same as Example 1.

Comparative Example 1

A multi-layered mat having five strand layers and a thickness of 62 mm was formed in a manner similar to that in Example 1. Strands with common densities (average value: 393 kg/m$^3$) were used for all of the five strand layers. The multi-layered mat was then subjected to hot pressing under conditions similar to those in Example 1. The strand board thus obtained was used as Comparative Example 1. The time required to achieve a target thickness was 33 seconds. Comparative Example 1 is otherwise the same as Example 1.

Test A

Figures 14, 15:
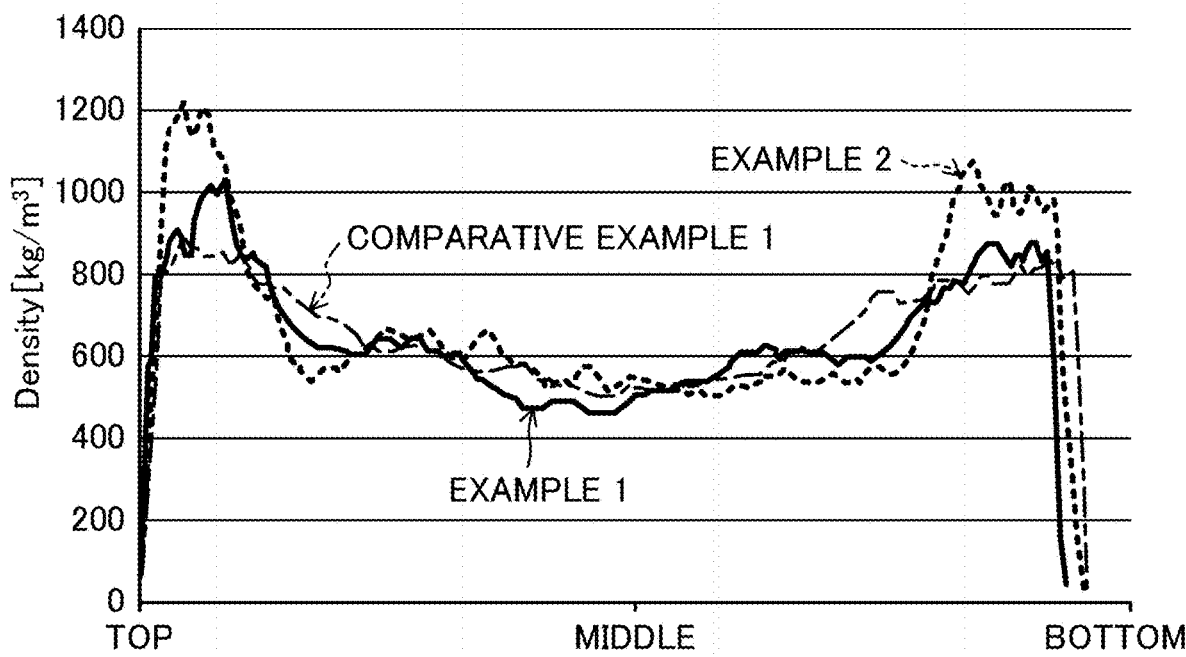
FIG. 14 is a table showing the results of a bending test for Examples 1, 2 and Comparative Example 1 of the second embodiment, along with their other physical properties.
FIG. 15 is a graph showing density distribution in the thickness direction (lamination direction) of Examples 1, 2 and Comparative Example 1 according to the second embodiment.

A normal-state bending test (bending test span: 225 mm) was conducted on each of Examples 1, 2 and Comparative Example 1. FIG. 14 shows the test results along with other physical properties.

Density distribution in thickness direction (lamination direction) of each strand board was measured with the density profile analyzer ("DENSE-LAB X" made by ELECTRONIC WOOD SYSTEMS GMBH). FIG. 15 shows the measurement results.

The results in FIG. 14 show that, as can be seen from comparison between Examples 1, 2 and Comparative Example 1, the use of high-density strand layers as the first and fifth strand layers located at the top and bottom out of the five strand layers allows the multi-layered mat before hot pressing to have a smaller thickness (bulk height) and thus facilitates compression of the multi-layered mat by hot pressing, thereby reducing the press time required to press the multi-layered mat to a target thickness (time to achieve the target thickness). Regarding flexural properties in the normal-state bending test, MORs and MOEs of Examples 1, 2 are about the same as those of Comparative Example 1.

Example 3

Mats of a large number of aspen strands were stacked into a multi-layered mat having five strand layers and a thickness of 70 mm. The strands had a thickness of 0.8 mm and a density of 300 to 600 kg/m$^3$. As in the first example (see FIG. 3) of the strand board of the second embodiment, strands with common densities (average value: 393 kg/m$^3$) were used for the first, third, and fifth strand layers of the five strand layers, namely the strand layers other than the second and fourth strand layers located in the intermediate part in the lamination direction. Strands with higher densities (average value: 933 kg/m$^3$) than the common densities were used for the second and fourth strand layers.

The multi-layered mat was then subjected to hot pressing at 140° C. and 4 N/mm$^2$ for 10 minutes, whereby a strand board having a density of 846 kg/m$^3$ and a thickness of 12.5 mm was obtained. This strand board was used as Example 3. The MDI content or dozing was 12%.

Comparative Example 2

A multi-layered mat having five strand layers and a thickness of 78 mm was formed in a manner similar to that in Example 3. Strands with common densities (average value: 393 kg/m$^3$) were used for all of the five strand layers. The multi-layered mat was then subjected to hot pressing at 140° C. and 8 N/mm$^2$ for 10 minutes, whereby a strand board having a density of 846 kg/m$^3$ and a thickness of 12.6 mm was obtained. This strand board was used as Comparative Example 2. Comparative Example 2 is otherwise the same as Example 3.

Test B

A normal-state bending test and a boiling test were conducted on Example 3 and Comparative Example 2. The boiling test was conducted in accordance with the cyclic boiling test defined in Japanese Agricultural Standard for Plywood. After the boiling test was conducted twice, thickness swelling TS, water absorption WA, and internal bond strength IB were measured. FIG. 14 shows the measurement results along with other physical properties.

Figure 17:
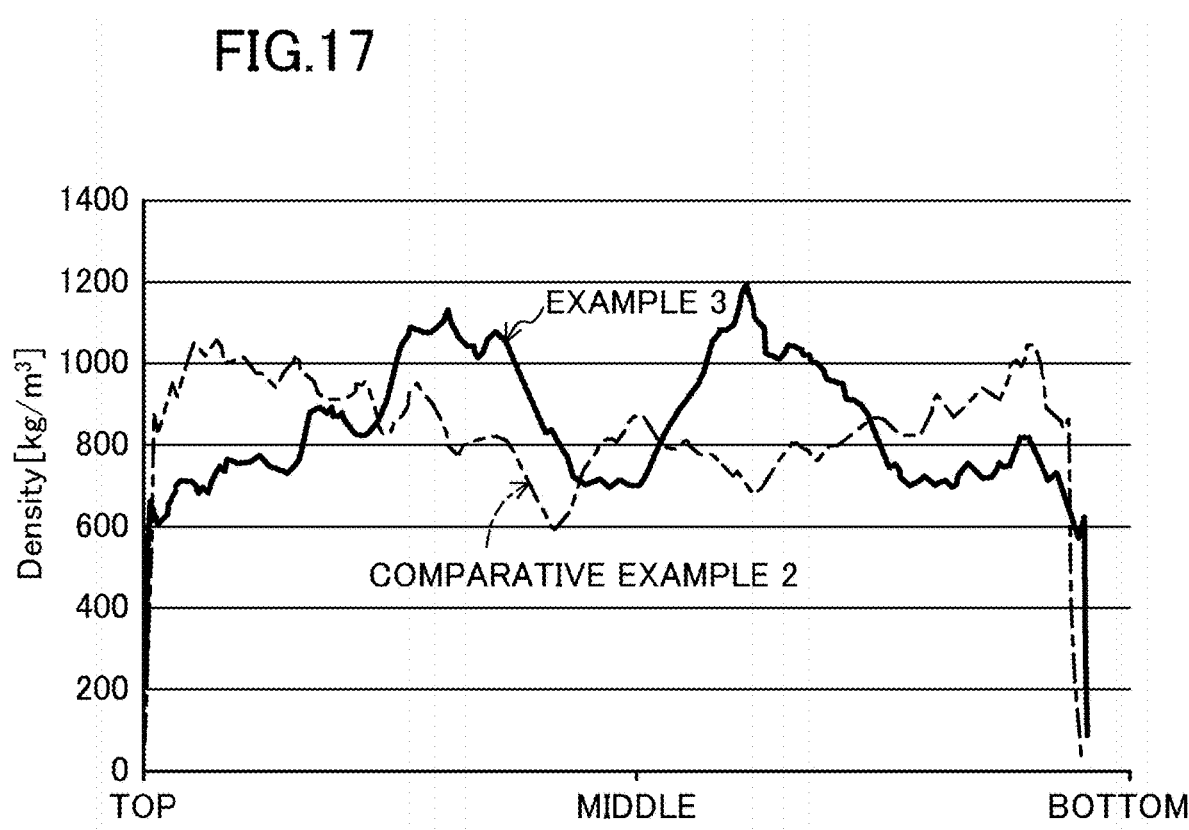
FIG. 17 is a graph showing density distribution in the thickness direction (lamination direction) of Example 3 and Comparative Example 2 according to the second embodiment.

FIG. 17 shows density distribution in the thickness direction (lamination direction) of each strand board measured with the density profile analyzer as in Test A.

The results in FIG. 16 show that, regarding Example 3 in which the second and fourth strand layers located in the intermediate part in the thickness direction out of the five strand layers are high-density strand layers and Comparative Example 2 in which all of the five strand layers are low-density strand layers, flexural strength and internal bond strength IB after the boiling tests of Example 3 are either the same or higher than Comparative Example 2. Namely, the flexural strength and internal bond strength IB after the boiling tests of Example 3 are not lower than Comparative Example 2.

The results thus show that the use of high-density strand layers as the second and fourth strand layers of the five strand layers allows a strand board with performance similar to that of Comparative Example 2 to be formed by using a lower pressure of 4 N/mm$^2$ instead of such a high pressure (8 N/mm$^2$) as used in Comparative Example 2.

Example 4

Mats of a large number of aspen strands were stacked into a multi-layered mat having five strand layers and a thickness of 130 mm. The strands had a thickness of 0.8 mm and a density of 300 to 600 kg/m$^3$. As in the sixth example (see FIG. 8) of the strand board of the second embodiment, strands with common densities (average value: 413 kg/m$^3$) were used for the first and fifth strand layers of the five strand layers, namely for the strand layers other than the second to fourth strand layers located in the intermediate part in the lamination direction. Strands with higher densities (average value: 1100 kg/m$^3$) than the common densities were used for the second to fourth strand layers.

The multi-layered mat was then subjected to hot pressing at 160° C. and 8 N/mm$^2$ for 60 minutes, whereby a strand board having a predetermined density and thickness (see FIG. 18) was obtained. This strand board was used as Example 4.

Comparative Example 3

A multi-layered mat having five strand layers was formed in a manner similar to that in Example 4. Strands with common densities (average value: 413 kg/m$^3$) were used for all of the five strand layers. The multi-layered mat was then subjected to hot pressing at 140° C. and 8 N/mm$^2$ for 60 minutes, whereby a strand board having a predetermined density and thickness (see FIG. 18) was obtained. This strand board was used as Comparative Example 3. The processes were otherwise the same as those of Example 4.

Comparative Example 4

A multi-layered mat having five strand layers was formed in a manner similar to that in Example 4. Strands with common densities (average value: 413 kg/m$^3$) were used for all of the five strand layers. The multi-layered mat was then subjected to hot pressing at 160° C. and 8 N/mm$^2$ for 30 minutes, whereby a strand board having a predetermined density and thickness was obtained. This strand board was used as Comparative Example 4. In Comparative Example 4, hot pressing was performed at a higher temperature than in Comparative Example 3 in order to avoid insufficient curing of an adhesive during winter time. Comparative Example 4 is small in size, and the press time was shorter than in Example 4 and Comparative Example 3. The processes were otherwise the same as those of Example 4.

Test C

A normal-state bending test, a boiling test, and a bond durability test were conducted on Example 4 and Comparative Example 3. FIG. 18 shows the test results along with other physical properties. In FIG. 18, "Elastic Limit Pmax" refers to elastic limit load, "Ratio of ELP" refers to the ratio of Elastic Limit Pmax to maximum load (Pmax), and "Inside Share Strength" refers to internal shear fracture strength. Regarding the bending direction, "longitudinal" refers to the longitudinal direction of the board, "lateral" refers to the lateral direction of the board, and "N=2 (N=3)" means that the number of test pieces was 2 or 3. Moreover, "TS" indicates thickness swelling, "WA" indicates water absorption, and "IB" indicates internal bond strength.

A nail pull test was conducted on Example 4 and Comparative Example 4. In the nail pull test, a lead hole with an inside diameter of 2 mm and a depth of 25 mm was formed in advance in each sample of Example 4 and Comparative Example 4. Three samples of Example 4 and four samples of Comparative Example 4 were tested, and the average value of the samples was calculated for each of Example 4 and Comparative Example 4. FIG. 19 shows the results.

Figure 20:
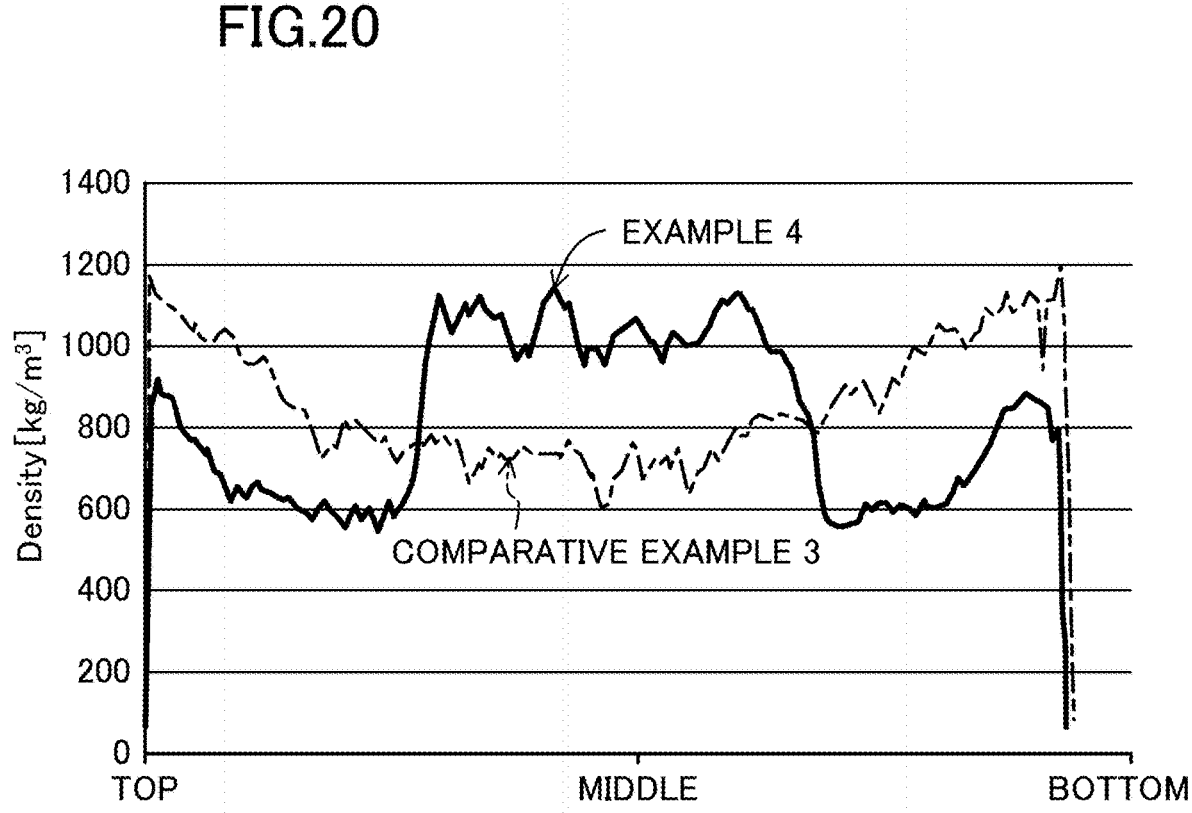
FIG. 20 is a graph showing density distribution in the thickness direction (lamination direction) of Example 4 and Comparative Example 3 according to the second embodiment.

FIG. 20 shows density distribution in the thickness direction (lamination direction) of each strand board measured with the density profile analyzer as in Test A.

The results in FIG. 18 show that, regarding Example 4 in which the second to fourth strand layers located in the intermediate part in the lamination direction out of the five strand layers are high-density strand layers and Comparative Example 3 in which all of the five strand layers are low-density strand layers, flexural strength of Example 4 is about the same as that of Comparative Example 3, and internal bond strength after the boiling test of Example 4 is higher than that of Comparative Example 3.

These results show that the use of high-density strand layers as the second to fourth strand layers of the five strand layers allows a strand board with performance similar to that of Comparative Example 3 to be formed.

The results of FIG. 19 show that the use of high-density strand layers as the second to fourth strand layers located in the intermediate part in the thickness direction out of the five strand layers increases nail pull resistance (force) and achieves improvement in performance.

INDUSTRIAL APPLICABILITY

The present invention is suitable for use as flooring materials for containers, watercraft, vehicles, etc. The present invention is extremely useful as new building materials that are suitable for use as flooring materials and structural bracing boards for buildings such as houses. The present invention thus has high industrial applicability.

DESCRIPTION OF REFERENCE CHARACTERS

B Strand Board (Wood Laminate Material)
1 Strand Layer (Woodbased Material Layer)
1a High-Density Strand Layer (High-Density Woodbased Material Layer)
1b Low-Density Strand Layer (Low-Density Woodbased Material Layer)
5 Strand (Cut Piece)

The invention claimed is:

1. A wood laminate material, comprising:
a stack of laminated woodbased material layers, each of the laminated woodbased material layers being a strand mat formed of multiple strands that are cut pieces of wood,
wherein fibers of the strands extend in the same direction in each laminated woodbased material layer,
the fibers of the strands in adjoining ones of the laminated woodbased material layers extend in directions crossing each other,
the wood laminate material as a whole has a substantially constant density distribution in a lamination direction of the laminated woodbased material layers, and
the substantially constant density distribution is such that the density does not vary more or less than 60 kg/m$^3$ from an average density of the stack of laminated woodbased material layers.

2. The wood laminate material according to claim 1, wherein the strands have a density of 300 kg/m$^3$ or more and 1100 kg/m$^3$ or less.

3. The wood laminate material according to claim 1, wherein the laminated woodbased material layers are composed so that a thickness of the woodbased material layers gradually increases from the middle woodbased material layer in the lamination direction of the wood laminate material to the top and bottom woodbased material layers.

4. The wood laminate material according to claim 1, wherein of the multiple woodbased material layers, fibers of the strands in the top and bottom woodbased material layers extend in the same direction.

5. The wood laminate material according to claim 1, wherein the number of woodbased material layers is odd.

6. The wood laminate material according to claim 1, wherein the laminated woodbased material layers are laminated so that overall density distribution provided by the laminated woodbased material layers is plane symmetric with respect to a center in the lamination direction.

7. A wood laminate material, comprising:
a stack of three or more laminated woodbased material layers, each of the laminated woodbased material layers being a strand mat formed of multiple strands that are cut pieces of wood, wherein:
the stack of three or more laminated woodbased material layers includes one or more high-density woodbased material layers, the remainder of the laminated woodbased material layers each being a low-density woodbased material layer, and each of the one or more high-density woodbased material layers has a higher density than each of the low-density woodbased material layers,
fibers of the strands extend in the same direction in each woodbased material layer,
the fibers of the strands in adjoining ones of the woodbased material layers extend in directions crossing each other,
the woodbased material layers located at both ends in the lamination direction of the woodbased material layers are the low-density woodbased material layers, and
one or more of the woodbased material layers located in an intermediate part in the lamination direction of the woodbased material layers is the one or more high-density woodbased material layers.

8. The wood laminate material according to claim 7, wherein of the stack of three or more laminated woodbased material layers, fibers of the strands in the top and bottom woodbased material layers extend in the same direction.

9. The wood laminate material according to claim 7, wherein the number of woodbased material layers is odd.

10. The wood laminate material according to claim 7, wherein the stack of three or more laminated woodbased material layers is laminated so that an overall density distribution provided by the stack is plane symmetric with respect to a center of the stack in the lamination direction.

11. The wood laminate material according to claim 7, wherein the strands have a density of 300 kg/m$^3$ or more and 1100 kg/m$^3$ or less.

12. The wood laminate material according to claim 7, wherein the stack of three or more laminated woodbased material layers is composed so that a thickness of the woodbased material layers gradually increases from the middle woodbased material layer in the lamination direction of the wood laminate material to the top and bottom woodbased material layers.

* * * * *